(12) United States Patent
Imajo

(10) Patent No.: US 9,025,087 B2
(45) Date of Patent: May 5, 2015

(54) LIQUID CRYSTAL DISPLAY DEVICE AND TELEVISION RECEIVER

(71) Applicant: Panasonic Liquid Crystal Display Co., Ltd., Himeji-shi, Hyogo (JP)

(72) Inventor: Ikuko Imajo, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 14/193,841

(22) Filed: Feb. 28, 2014

(65) Prior Publication Data

US 2014/0313424 A1  Oct. 23, 2014

Related U.S. Application Data

(63) Continuation of application No. PCT/JP2012/063940, filed on May 30, 2012.

(30) Foreign Application Priority Data

Aug. 29, 2011 (JP) .................. 2011-186080
Aug. 29, 2011 (JP) .................. 2011-186081
Aug. 29, 2011 (JP) .................. 2011-186082

(51) Int. Cl.
  *H04N 3/14* (2006.01)
  *G09G 3/36* (2006.01)
  *F21V 8/00* (2006.01)
  *G02F 1/1335* (2006.01)

(52) U.S. Cl.
  CPC .............. *G09G 3/36* (2013.01); *G02B 6/0011* (2013.01); *G02F 1/133603* (2013.01); *G02F 1/133605* (2013.01); *G02F 2001/133613* (2013.01); *G02F 2001/133628* (2013.01); *G02F 2001/133612* (2013.01)

(58) Field of Classification Search
  USPC ................ 348/790, 791, 794, 801–803, 836; 349/61, 58
  See application file for complete search history.

(56) References Cited

U.S. PATENT DOCUMENTS

| 4,826,294 A | 5/1989 | Imoto |
| 5,040,868 A | 8/1991 | Waitl et al. |
| 6,601,970 B2 | 8/2003 | Ueda et al. |

(Continued)

FOREIGN PATENT DOCUMENTS

| JP | 10-082915 | 3/1998 |
| JP | 2007-286627 | 11/2007 |

(Continued)

*Primary Examiner* — Paulos M Natnael
(74) *Attorney, Agent, or Firm* — Hamre, Schumann, Mueller & Larson, P.C.

(57) ABSTRACT

A liquid crystal display device includes: a liquid crystal panel; a reflection sheet arranged on a rear surface side of the liquid crystal panel, the reflection sheet being curved so that a surface facing the liquid crystal panel is recessed; and a light emitting diode substrate including: a light emitting diode array in which a plurality of light emitting diodes are arranged along a longitudinal direction; and electrodes connected to the plurality of light emitting diodes. In a circle which is centered at one light emitting diode and whose diameter is a distance from the one light emitting diode to another light emitting diode adjacent to the one light emitting diode, an area of the electrode connected to a high temperature side electrode of the one light emitting diode is larger than an area of the electrode connected to a low temperature side electrode of the one light emitting diode.

17 Claims, 28 Drawing Sheets

(56) References Cited

U.S. PATENT DOCUMENTS

| | | |
|---|---|---|
| 8,164,704 B2 * | 4/2012 | Kim et al. ............... 349/58 |
| 8,210,732 B2 * | 7/2012 | Okumura et al. ............ 362/628 |
| 2004/0208003 A1 | 10/2004 | Kuo |
| 2005/0162869 A1 | 7/2005 | Kanatsu |
| 2005/0265029 A1 * | 12/2005 | Epstein et al. ............... 362/339 |
| 2007/0009820 A1 | 1/2007 | Ueda |
| 2007/0047225 A1 | 3/2007 | Sudo |
| 2007/0121343 A1 | 5/2007 | Brown |
| 2007/0211205 A1 | 9/2007 | Shibata |
| 2007/0247833 A1 | 10/2007 | Lee et al. |
| 2008/0007938 A1 | 1/2008 | Chou et al. |
| 2008/0030653 A1 | 2/2008 | Lee et al. |
| 2008/0099777 A1 | 5/2008 | Erchak et al. |
| 2009/0073346 A1 | 3/2009 | Mikami |
| 2009/0316072 A1 * | 12/2009 | Okumura et al. ............... 349/64 |
| 2010/0073914 A1 | 3/2010 | Park et al. |
| 2010/0079059 A1 * | 4/2010 | Roberts et al. ............... 313/503 |
| 2010/0079977 A1 | 4/2010 | Lee et al. |
| 2011/0044024 A1 | 2/2011 | Kim et al. |
| 2011/0044053 A1 | 2/2011 | Yamaguchi |
| 2011/0122349 A1 | 5/2011 | Amimoto et al. |
| 2011/0317095 A1 | 12/2011 | Shimizu |
| 2012/0092562 A1 | 4/2012 | Omiya et al. |
| 2012/0099046 A1 * | 4/2012 | Kasai ............... 349/61 |
| 2012/0105764 A1 * | 5/2012 | Yokota ............... 349/61 |
| 2012/0113328 A1 * | 5/2012 | Takeshima et al. ........... 348/739 |
| 2012/0188486 A1 | 7/2012 | Baba |
| 2012/0188489 A1 | 7/2012 | Baba |
| 2013/0135537 A1 * | 5/2013 | Kuromizu ............... 348/790 |
| 2014/0125913 A1 * | 5/2014 | Lee et al. ............... 349/58 |

FOREIGN PATENT DOCUMENTS

| | | |
|---|---|---|
| JP | 2007-305341 | 11/2007 |
| JP | 2011-101054 | 5/2011 |
| KR | 10-2011-0004995 | 1/2011 |
| WO | 2011/002078 | 1/2011 |

\* cited by examiner

PRIOR ART

PRIOR ART

LIQUID CRYSTAL DISPLAY DEVICE AND TELEVISION RECEIVER

CROSS-REFERENCE TO RELATED APPLICATION

This application is Bypass Continuation of international patent application PCT/JP2012/063940 filed on May 30, 2012 designating the United States of America, the entire disclosure of which is incorporated herein by reference. Priority is claimed based on Japanese patent application JP2011-186080 filed on Aug. 29, 2011; Japanese application JP2011-186081 filed on Aug. 29, 2011; Japanese application JP2011-186082 filed on August 29. The entire disclosure of Japanese patent applications JP2011-186080, JP2011-186081, JP2011-186082 are incorporated herein by reference in their entirety.

TECHNICAL FIELD

The present application relates to a liquid crystal display device including a backlight unit that uses LEDs as light sources, and a television receiver including the liquid crystal display device. In particular, the present application relates to a technology for improving heat dissipation performance for LEDs.

BACKGROUND

Japanese Patent Application Laid-open No. 2007-286627 discloses a liquid crystal display device including a direct type backlight unit. In the liquid crystal display device, a plurality of light emitting diodes are used as light sources of the backlight unit. The light emitting diodes are arranged in matrix across an entire region of the backlight unit.

Further, Japanese Patent Application Laid-open No. 2007-305341 also uses a direct type backlight unit in which a plurality of LEDs are arranged in matrix as light sources.

In the liquid crystal display device described in Japanese Patent Application Laid-open No. 2007-286627, the light emitting diodes are arranged across the entire region of the backlight unit, and hence the size of a substrate on which a large number of light emitting diodes are arranged needs to be large enough to cover the entire region of the backlight unit. This increases cost for preparing a large number of light emitting diodes as well as a material cost of the substrate on which the light emitting diodes are to be arranged.

Also in the structure in which the plurality of LEDs are arranged in matrix as exemplified by the backlight unit described in Japanese Patent Application Laid-open No. 2007-305341, the necessary number of LEDs is large to have the same problem.

To address the problem, studies have been made on the structure in which the light emitting diodes are arranged at a part of the backlight unit along a particular direction, that is, the LEDs are arranged only at a vertical or horizontal center portion of the backlight unit, and a reflection sheet is used to expand light of the LEDs in the vertical or horizontal direction. For example, it is conceivable to arrange the light emitting diodes in the vicinity of the lateral center of the backlight unit in a concentrated manner along the long-side direction of the backlight unit, and to reflect or diffuse light beams of the light emitting diodes with use of an appropriate reflection sheet so that the light beams may irradiate an entire image formation region. This structure, however, needs to increase the arrangement density of the LEDs, and hence temperature of the LEDs is liable to be high.

FIG. 9 is a partial enlarged plan view illustrating how a plurality of light emitting diodes 13 are arranged linearly on a light emitting diode substrate 7. Note that, a lens 14 for diffusing a light beam is arranged on a light emitting surface side of each light emitting diode 13. In FIG. 9, parts located behind the lens 14 are illustrated by broken lines. As illustrated in FIG. 9, the light emitting diodes 13 are arranged in series in the longitudinal direction of the liquid crystal display device, that is, in the horizontal direction of FIG. 9.

In this case, an electrode 21 connected to an anode and a cathode of each light emitting diode 13 is spread in plan to have a so-called solid pattern as illustrated in FIG. 9. This is for the purpose of diffusing and dissipating heat from the light emitting diode 13 owing to the electrode 21 having high heat conductivity. Upper limits of the maximum output and the arrangement density of the light emitting diodes 13 are determined based on such heat dissipation ability of the electrode 21. In other words, as the electrode 21 has higher heat dissipation performance, the light emitting diode 13 with a higher output can be used for the light emitting diode substrate 7 of the same area, or the light emitting diodes 13 can be arranged at higher density. Alternatively, when the output of the light emitting diode 13 is the same, the size of the light emitting diode substrate 7 can be reduced more as the electrode 21 has higher heat dissipation performance.

By the way, heat generated from the light emitting diode 13 is transferred to the electrode 21 via the anode and the cathode, but in a light emitting diode 13 commonly used at present, the transfer amount of heat is not equal between the anode and the cathode. In the example illustrated in FIG. 9, no consideration is made on such circumstances and the electrode 21 has the same pattern on the side connected to the anode and on the side connected to the cathode. One of the anode and the cathode having a larger amount of heat generation with higher temperature is referred to as "high temperature side electrode", and another having a smaller amount of heat generation with relatively lower temperature is referred to as "low temperature side electrode". In this case, the maximum output and the arrangement density of the light emitting diodes 13 are determined based on heat dissipation performance for the high temperature side electrode subjected to severe thermal conditions. In such a case, heat dissipation performance for the low temperature side electrode has room to improve, and hence the heat dissipation performance has room to further improve. Note that, in most light emitting diodes used at present, the amount of heat generation at the cathode is larger than the amount of heat generation at the anode. In other words, the amount of heat transferred to the electrode 21 is larger on the cathode side and its temperature becomes higher as well.

Alternatively, depending on the size of the liquid crystal display device, it is sometimes necessary to arrange the light emitting diodes in two or more rows, because a sufficient amount of light for illuminating the entire image formation region cannot be obtained by simply arranging the light emitting diodes linearly in one row.

FIG. 18 is a partial enlarged plan view illustrating how the plurality of light emitting diodes 13 are arranged linearly in two rows on the light emitting diode substrate 7. Note that, the lens 14 for diffusing a light beam is arranged on the light emitting surface side of each light emitting diode 13. In FIG. 18, parts located behind the lens 14 are illustrated by broken lines. As illustrated in FIG. 18, the light emitting diodes 13 are arranged in two rows in series in the longitudinal direction of the liquid crystal display device, that is, in the horizontal direction of FIG. 18, and in parallel in the lateral direction of the liquid crystal display device, that is, in the vertical direction of FIG. 18. The light emitting diodes 13 are arranged in the respective rows at staggered positions. This is for the purpose of obtaining as uniform illumination as possible in the longitudinal direction. In such a case, the arrangement density of the light emitting diodes 13 becomes higher, and the temperature of the light emitting diode 13 is liable to be higher.

Further, in the case where the plurality of LEDs are arranged in three or four rows at the vertical or horizontal center portion, the temperature of the LEDs arranged in the middle row(s) sandwiched by the two rows on both sides is liable to be high.

The present application has been made in view of the above-mentioned circumstances, and it is an object thereof to efficiently dissipate heat generated from a light emitting diode in a liquid crystal display device including a backlight unit for irradiating an entire image formation region with light of light emitting diodes arranged in a concentrated manner.

It is another object of the present application to provide a liquid crystal display device capable of improving heat dissipation performance for LEDs and a television receiver including the liquid crystal display device.

SUMMARY

Representative embodiments disclosed in the present application are briefly described as follows.

In one general aspect, the instant application describes a liquid crystal display device includes a liquid crystal panel; a reflection sheet arranged on a rear surface side of the liquid crystal panel, the reflection sheet being curved so that a surface facing the liquid crystal panel is recessed; and a light emitting diode substrate includes a light emitting diode array in which a plurality of light emitting diodes are arranged along a longitudinal direction of the light emitting diode substrate; and electrodes connected to the plurality of light emitting diodes. In a circle whose center is at one of the plurality of light emitting diodes and whose diameter is a distance from the one of the plurality of light emitting diodes to another of the plurality of light emitting diodes adjacent to the one of the plurality of light emitting diodes, an area of the electrode connected to a high temperature side electrode of the one of the plurality of light emitting diodes is larger than an area of the electrode connected to a low temperature side electrode of the one of the plurality of light emitting diodes. The plurality of light emitting diodes are arranged so that the low temperature side electrodes and the high temperature side electrodes are adjacent to one another in the longitudinal direction, and each of the plurality of light emitting diodes has a lens arranged in front thereof.

The above general aspect may include one or more of the following features. The low temperature side electrode may include an anode of each of the plurality of light emitting diodes, and the high temperature side electrode may include a cathode of the each of the plurality of light emitting diodes.

The electrode connected to the low temperature side electrode of the one of the plurality of light emitting diodes and the electrode connected to the high temperature side electrode of the one of the plurality of light emitting diodes may partially overlap with each other in a lateral direction of the light emitting diode substrate.

At least a part of a boundary to separate the electrode connected to the low temperature side electrode of the one of the plurality of light emitting diodes and the electrode connected to the high temperature side electrode of the one of the plurality of light emitting diodes may be non-parallel to a lateral direction, and may be inclined toward the electrode connected to the low temperature side electrode, starting from the one of the plurality of light emitting diodes.

In another general aspect, the liquid crystal display device of the present application includes a liquid crystal panel; a reflection sheet arranged on a rear surface side of the liquid crystal panel, the reflection sheet being curved so that a surface facing the liquid crystal panel is recessed; and a light emitting diode substrate includes a plurality of light emitting diode arrays, in each of which a plurality of light emitting diodes are arranged along a longitudinal direction of the light emitting diode substrate; and electrodes connected to the plurality of light emitting diodes. The electrode belonging to one of the plurality of light emitting diode arrays and the electrode belonging to another of the plurality of light emitting diode arrays are shaped to overlap with each other in the longitudinal direction. In a circle whose center is at one of the plurality of light emitting diodes and whose diameter is a distance from the one of the plurality of light emitting diodes to another of the plurality of light emitting diodes closest to the one of the plurality of light emitting diodes, an area of the electrode connected to a high temperature side electrode of the one of the plurality of light emitting diodes is larger than an area of the electrode connected to a low temperature side electrode of the one of the plurality of light emitting diodes.

The above another general aspect may include one or more of the following features. In a circle whose center is at one of the plurality of light emitting diodes and whose diameter is a distance from the one of the plurality of light emitting diodes to another of the plurality of light emitting diodes closest to the one of the plurality of light emitting diodes, an area of the electrode connected to a high temperature side electrode of the one of the plurality of light emitting diodes may be larger than an area of the electrode connected to a low temperature side electrode of the one of the plurality of light emitting diodes.

The low temperature side electrode may include an anode of each of the plurality of light emitting diodes, and the high temperature side electrode may include a cathode of the each of the plurality of light emitting diodes.

A length of a portion of the electrode connected to the high temperature side electrode in a lateral direction of the light emitting diode substrate may be larger than a length of a portion of the electrode connected to the low temperature side electrode in the lateral direction.

A radius of a semicircle whose center is at the one of the plurality of light emitting diodes and which is inscribed in the electrode on the high temperature side electrode side may be larger than a radius of a semicircle whose center is at the one of the plurality of light emitting diodes and which is inscribed in the electrode on the low temperature side electrode side.

In another general aspect, the liquid crystal display device of the present application includes a liquid crystal display panel; and a backlight unit, the backlight unit includes a circuit board having a plurality of light emitting diodes (LEDs) serving as light sources mounted thereon, the circuit board being arranged to be opposed to the liquid crystal display panel and being smaller than the liquid crystal display panel in width in a first direction that is one of a vertical direction and a horizontal direction of the liquid crystal display panel; and two regions devoid of the light sources, the two regions being located on opposite sides across the circuit board in the first direction and each having a width larger than the width of the circuit board in the first direction. The LEDs are arranged in at least three rows in a second direction orthogonal to the first direction. The circuit board includes a plurality of connection plates arranged thereon, the plurality of connection plates being located between two of the plurality of LEDs adjacent in the second direction so as to electrically connect the two of the plurality of LEDs to each other. The connection plates arranged in a row between two rows on both sides among the at least three rows are larger than the plurality of connection plates arranged in the two rows on both sides.

The above another general aspect may include one or more of the following features. The connection plates arranged in the row between the two rows on both sides may be larger than the plurality of connection plates arranged in the two rows on both sides in width in the first direction.

The connection plates arranged in the row between the two rows on both sides may be equal to the plurality of connection plates arranged in the two rows on both sides in width in the second direction.

Positions of the plurality of LEDs in one of two adjacent rows may be offset with respect to positions of the plurality of LEDs in another of the two adjacent rows in the second direction.

The liquid crystal display device may further include a reflection sheet for reflecting light of the plurality of LEDs toward the liquid crystal display panel. The reflection sheet may have a concave shape that is open toward the liquid crystal display panel, and the circuit board may be located at a bottom of the reflection sheet.

The circuit board may have at least five rows, each of which may include the plurality of LEDs and the plurality of connection plates. The connection plates arranged in the at least five rows may be larger in accordance with a distance from the two rows on both sides to the row in which the plurality of connection plates are arranged.

The connection plates may be rectangular.

The connection plates may include an edge portion connected to each of the plurality of LEDs. The connection plate may include a protrusion portion on the edge portion side to protrude in the first direction.

A television receive may include the liquid crystal display device, the television receiver being configured to receive a television broadcast wave to display a video and output sound.

According to the implementations described above, in the liquid crystal display device including the backlight unit for irradiating the entire image formation region with light of the light emitting diodes arranged in a concentrated manner, the heat generated from the light emitting diode can be efficiently dissipated.

Further, according to the implementations described above, heat of the LED can be released from the connection plates. The connection plate arranged in the row between the two rows on both sides is larger than the connection plate arranged in the two rows on both sides. Consequently, the heat of the LEDs arranged in the row between the two rows on both sides can be efficiently released.

Further, according to the implementations described above, there is no need to decrease arrangement density of the LEDs arranged in the middle row as compared to arrangement density of the LEDs arranged in the two rows on both sides. As a result, brightness of the backlight unit can be enhanced easily.

Further, according to the implementations described above, the arrangement density of the LEDs becomes uniform among the respective rows.

Further, according to the implementations described above, the heat from the LEDs is easily dispersed.

Further, according to the implementations described above, the light of the LEDs is easily expanded to the entire liquid crystal display panel.

Further, according to the implementations described above, also in the structure having a large number of rows, the heat of the LEDs arranged in the middle rows can be efficiently released.

Further, according to the implementations described above, the area of the connection plate is easily ensured.

In the circuit board, temperature becomes particularly higher in the vicinity of a terminal of the LED, and heat spreads in a concentric manner. According to the implementations described above, it is possible to increase the radius of a circle that can be drawn on the connection plate and is centered at the terminal of the LED. Consequently, the heat of the LED can be further efficiently released.

DETAILED DESCRIPTION

Now, a first embodiment of the present application is described below with reference to the accompanying drawings.

Figure 1:
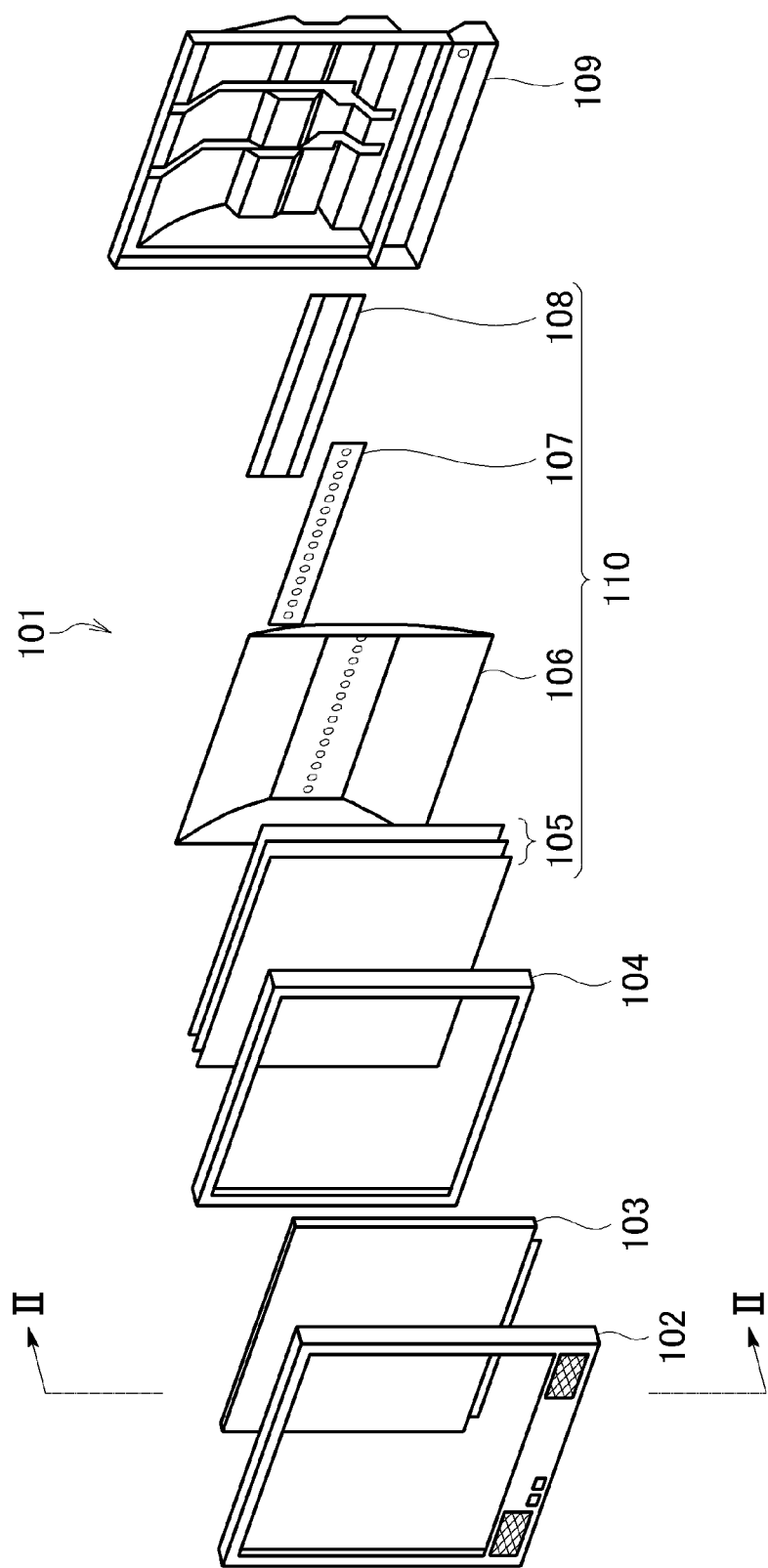
FIG. 1 is an exploded perspective view of a liquid crystal display device according to a first embodiment of the present application.

FIG. 1 is an exploded perspective view of a liquid crystal display device 101 according to this embodiment. As illustrated in FIG. 1, the liquid crystal display device 101 is assembled by arranging, in order from the front side, an upper frame 102, a liquid crystal panel 103, an intermediate frame 104, an optical sheet group 105, a reflection sheet 106, a light emitting diode substrate 107, a radiator plate 108, and a lower frame 109. Note that, the optical sheet group 105, the reflection sheet 106, the light emitting diode substrate 107, and the radiator plate 108 together construct a backlight unit 110 that functions as a planar light source for illuminating the liquid crystal panel 103 from the rear surface side thereof. FIG. 1 illustrates only structural components of the liquid crystal display device 101 and omits other components, such as a control board and a speaker.

Figure 2:
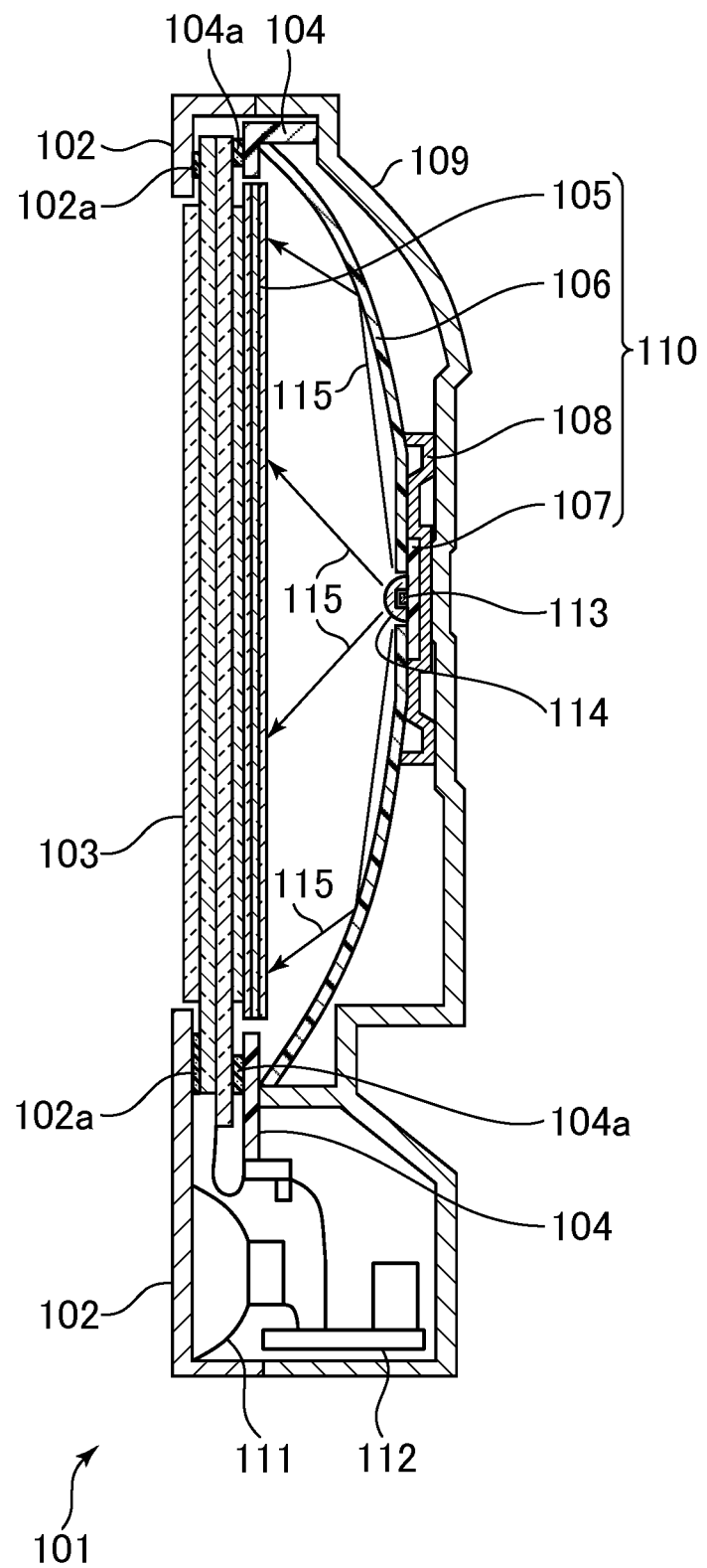
FIG. 2 is a schematic cross-sectional view of the liquid crystal display device taken along the line II-II of FIG. 1.

FIG. 2 is a schematic cross-sectional view of the liquid crystal display device 101 taken along the line II-II of FIG. 1. FIG. 2 illustrates a schematic cross-section of the assembled liquid crystal display device 101. As illustrated in FIG. 2, the liquid crystal display device 101 is structured to store the liquid crystal panel 103 and the backlight unit 110 in an outer frame formed of the upper frame 102 and the lower frame 109. The intermediate frame 104 is provided between the liquid crystal panel 103 and the backlight unit 110 so that the liquid crystal panel 103 and the backlight unit 110 are retained independently. The left side in FIG. 2 is the side where a user observes an image, which is hereinafter referred to as "front side", and the surface facing the front side is referred to as "front surface". The opposite side of the front side is referred to as "rear surface side", and the surface facing the rear surface side is referred to as "rear surface".

Note that, the liquid crystal display device 101 exemplified in this embodiment is a television receiver. Therefore, the liquid crystal display device 101 includes components for functioning as a television receiver, such as a speaker 111 illustrated in FIG. 2. Further, a control board 112 illustrated in FIG. 2 includes a power supply, a control circuit for the liquid crystal panel 103, and a control circuit for the backlight unit 110, as well as a circuit such as a tuner for receiving television broadcast. Note that, the liquid crystal display device 101 is not necessarily a television receiver, and may be a computer monitor, for example. In this case, the liquid crystal display device 101 may omit the components for functioning as a television receiver.

The upper frame 102 and the lower frame 109 construct a housing for storing the liquid crystal panel 103 and the backlight unit 110, and it is preferred that the upper frame 102 and the lower frame 109 be formed of a lightweight material having high rigidity. Examples of the material that may be used for the upper frame 102 and the lower frame 109 are metals, such as a steel plate, an aluminum alloy, and a magnesium alloy, FRP, and various kinds of synthetic resins. It is particularly preferred that the lower frame 109 be formed of a material having high heat conductivity in order to dissipate the heat generated due to light emission of the light emitting diodes efficiently, which is conducted from the light emitting diode substrate 107 via the radiator plate 108. In this embodiment, a steel plate is used. The material of the upper frame 102 may be the same as that of the lower frame 109 or may be different, and can be determined as appropriate considering the size, intended use, appearance, weight, and other factors of the liquid crystal display device 101. A buffer 102a is provided on the surface of the upper frame 102 facing the liquid crystal panel 103, so as to mitigate the shock occurring when the liquid crystal panel 103 swings due to vibration or the like and comes in contact with the upper frame 102. As the buffer 102a, an appropriate rubber, resin, sponge, or the like is used. It is to be understood that the support and buffer structure of the liquid crystal panel 103 described herein is an example.

The intermediate frame 104 is a member that retains the liquid crystal panel 103 and the backlight unit 110 independently in a separate manner. On the front surface of the intermediate frame 104, a buffer 104a is provided so as to mitigate the shock occurring when the liquid crystal panel 103 swings and comes in contact with the intermediate frame 104. As the buffer 104a, an appropriate rubber, resin, sponge, or the like is used. Note that, the structure of the intermediate frame 104 described herein is an example. The intermediate frame 104 may employ any structure that appropriately supports the liquid crystal panel 103 and the backlight unit 110, and may be omitted as occasion demands.

Also the material of the intermediate frame 104 is not particularly limited, but it is preferred to use a synthetic resin in terms of moldability and cost. In this embodiment, polycarbonate is used in terms of strength, but the material is not always limited thereto. As in fiber reinforced plastics (FRP), a reinforcing material may be mixed into a synthetic resin. It is also preferred that the intermediate frame 104 have light blocking properties and therefore be in black or dark color. The coloring of the intermediate frame 104 may be attained by a black or dark color material itself or by coating the surface of the intermediate frame 104. In this embodiment, the intermediate frame 104 is obtained by molding polycarbonate that is colored in black or dark color.

The backlight unit 110 includes the optical sheet group 105, the reflection sheet 106, the light emitting diode substrate 107, and the radiator plate 108. The light emitting diode substrate 107 of this embodiment is an elongated substrate on which a plurality of light emitting diodes 113 are linearly mounted, and is provided so that a longitudinal direction of the light emitting diode substrate 107 is aligned with a longitudinal direction of the liquid crystal display device 101. The light emitting diode substrate 107 is fixed to the radiator plate 108. In this case, the light emitting diode 113 in this embodiment is a so-called light emitting diode package in which a light emitting diode chip is sealed with a sealing resin, and is mounted onto the light emitting diode substrate 107. However, this is not a limitation, and as another example, a light emitting diode chip may be formed directly on the light emitting diode substrate 107. A lens 114 is an optical component for diffusing a light beam emitted from the light emitting diode 113 so as to obtain illumination with uniform brightness over an entire image formation region of the liquid crystal panel 103.

Note that, the light emitting diode substrate 107 in this embodiment is sized so that the length in the longitudinal direction is slightly smaller than the length of the liquid crystal panel 103 in a corresponding direction, about 70% to 80% in this embodiment. The length of the light emitting diode substrate 107 in the lateral direction (direction orthogonal to the longitudinal direction in the plane of the light emitting diode substrate 107) is smaller than the length of the liquid crystal panel 103 in the lateral direction, preferably half or less, and in this embodiment, roughly about 10% to 20%. Any insulating material can be used for the light emitting diode substrate 107 without any particular limitation, and the light emitting diode substrate 107 may be formed of an insulating material such as glass epoxy, paper phenol, and paper epoxy, or a metal with insulating coating. In the following, the longitudinal direction as used herein refers to the longitudinal direction of the light emitting diode substrate, that is, a direction in which the light emitting diodes 113 are arrayed. Note that, in this embodiment, the longitudinal direction of the light emitting diode substrate 107 is the direction parallel to the long side of the liquid crystal panel, but instead, the direction parallel to the short side of the liquid crystal display device 101 may be defined as the longitudinal direction. Further, the above-mentioned specific dimensions of the light emitting diode substrate 107 are an example, and may be arbitrarily changed depending on the design of the liquid crystal display device 101.

The reflection sheet 106 is a member for reflecting light from the light emitting diodes 113 to irradiate the rear surface of the liquid crystal panel 103 with light uniformly. The reflection sheet 106 has a curved cross-section as illustrated in FIG. 2. A light beam from the light emitting diode 113 is diffused in the vertical direction by the lens 114 provided on the front surface of the light emitting diode 113. As indicated by arrows 115 of FIG. 2, the light beam enters directly the optical sheet group 105, or is reflected on the reflection sheet 106 to enter the optical sheet group 105. The reflection sheet 106 and the optical sheet group 105 have the sizes corresponding to the liquid crystal panel 103, and hence the liquid crystal panel 103 is illuminated uniformly from the rear surface side thereof.

The reflection sheet 106 has the size corresponding to the liquid crystal panel 103 as described above, and has a curved shape to be recessed as viewed from the front surface side. The reflection sheet 106 is provided with holes at positions at which the light emitting diodes 113 are arranged, so as to expose the light emitting diodes 113 to the front surface side of the reflection sheet 106. The material of the reflection sheet 106 is not particularly limited, and a white reflection sheet using a polyethylene terephthalate (PET) resin or the like or a mirrored reflection sheet may be used. In this embodiment, a white reflection sheet is used. The optical sheet group 105 is a plurality of optical films including a diffusion sheet for diffusing light entering from the light emitting diodes 113, a prism sheet for refracting light beams toward the front surface side, and the like.

The radiator plate 108 is a metal plate to which the light emitting diode substrate 107 is mounted and which retains the reflection sheet 106. The radiator plate 108 itself is fixed to the lower frame 109. It is preferred that the material of the radiator plate 108 be high in heat conductivity, and various kinds of metal and alloy may be suitable for use. In this embodiment, aluminum is used. A molding method for the radiator plate 108 is not particularly limited, and any method such as pressing and cutting may be used. In this embodiment, the radiator plate 108 is obtained by an extrusion molding method.

Figure 3:
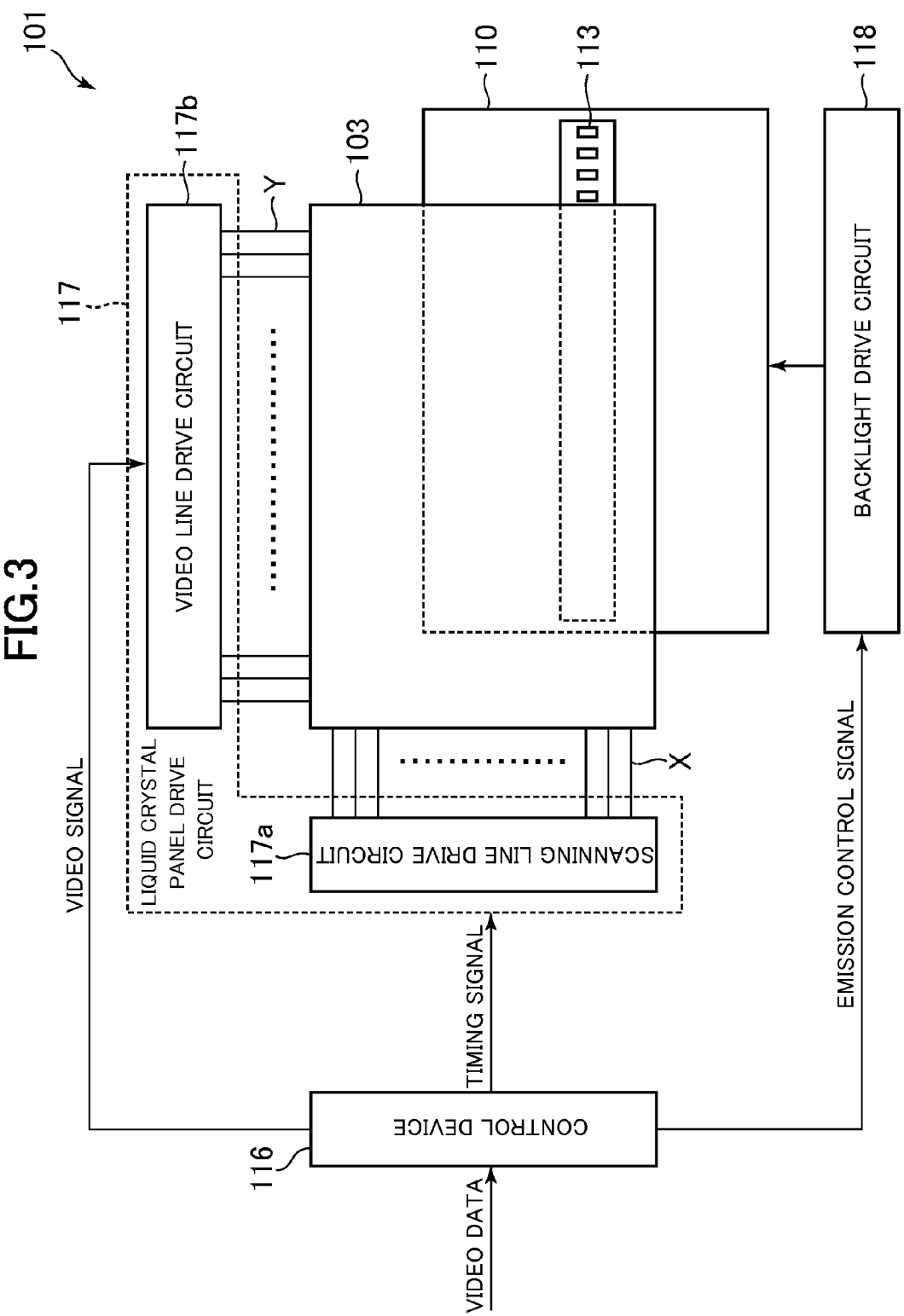
FIG. 3 is a configuration diagram illustrating a configuration of the liquid crystal display device.

FIG. 3 is a configuration diagram illustrating a configuration of the liquid crystal display device 101. Referring to FIG. 3, functions of respective members of the liquid crystal display device 101 are described below.

The liquid crystal panel 103 is rectangular, the lengths of which in the horizontal direction and the vertical direction are determined depending on the intended use of the liquid crystal display device 101. The liquid crystal panel 103 may have a horizontally-elongated shape (the length in the horizontal direction is larger than the length in the vertical direction) or a vertically-elongated shape (the length in the horizontal direction is smaller than the length in the vertical direction). Alternatively, the lengths in the horizontal direction and the vertical direction may be equal to each other. In this embodiment, the liquid crystal display device 101 is assumed to be used for a television receiver, and hence the liquid crystal panel 103 has a horizontally-elongated shape.

The liquid crystal panel 103 includes a pair of transparent substrates. On a TFT substrate as one of the transparent substrates, a plurality of video signal lines Y and a plurality of scanning signal lines X are formed. The video signal lines Y and the scanning signal lines X are orthogonal to each other to form a grid pattern. A region surrounded by adjacent two video signal lines Y and adjacent two scanning signal lines X corresponds to one pixel.

Figure 4:
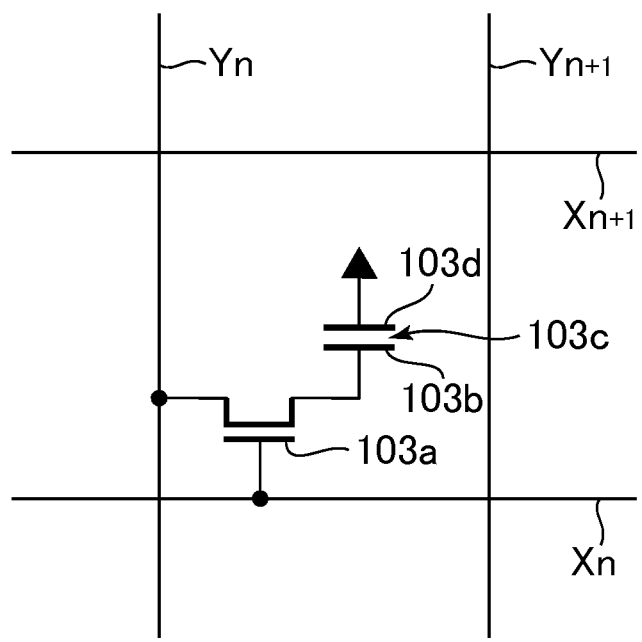
FIG. 4 illustrates a circuit diagram of one pixel formed in a liquid crystal panel.

FIG. 4 illustrates a circuit diagram of one pixel formed in the liquid crystal panel 103. In FIG. 4, a region surrounded by video signal lines Yn and Yn+1 and scanning signal lines Xn and Xn+1 corresponds to one pixel. The pixel focused here is driven by the video signal line Yn and the scanning signal line Xn. On the TFT substrate side of each of the pixels, a thin film transistor (TFT) 103a is provided. The TFT 103a is turned on by a scanning signal input from the scanning signal line Xn. The video signal line Yn applies a voltage (signal representing a grayscale value for each pixel) to a pixel electrode 103b of the pixel via the on-state TFT 103a.

On the other hand, a color filter is formed on a color filter substrate as the other of the transparent substrates and a liquid crystal 103c is sealed between the TFT substrate and the color filter substrate. Then, a common electrode 103d is formed so as to form a capacitance with the pixel electrode 103b via the liquid crystal 103c. The common electrode 103d is electrically connected to a common potential. Accordingly, depending on the voltage applied to the pixel electrode 103b, an electric field between the pixel electrode 103b and the common electrode 103d changes, thereby changing the orientation state of the liquid crystal 103c to control the polarization state of light beams passing through the liquid crystal panel 103. Polarization filters are respectively adhered to a display surface of the liquid crystal panel 103 and a rear surface thereof, which is the opposite surface of the display surface. With this, each pixel formed in the liquid crystal panel 103 functions as an element that controls light transmittance. Then, the light transmittance of each pixel is controlled in accordance with input image data, to thereby form an image. Therefore, in the liquid crystal panel 103, a region in which the pixels are formed is an image formation region.

Note that, the common electrode 103d may be provided in any of the TFT substrate and the color filter substrate. How to arrange the common electrode 103d depends on the liquid crystal driving mode. For example, in an in-plane switching (IPS) mode, the common electrode 103d is provided on the TFT substrate. In a vertical alignment (VA) mode or a twisted nematic (TN) mode, the common electrode is provided on the color filter substrate. This embodiment uses the IPS mode, where the common electrode 103d is provided on the TFT substrate. Further, the transparent substrates in this embodiment are formed of glass, but other materials such as a resin may be used.

Returning to FIG. 3, a control device 116 inputs video data received by a tuner or an antenna (both not shown) or video data generated in another device such as a video reproducing device. The control device 116 may be a microcomputer including a central processing unit (CPU) and a memory such as a read only memory (ROM) and a random access memory (RAM). The control device 116 performs various types of image processing, such as color adjustment, with respect to the input video data, and generates a video signal representing a grayscale value for each of the pixels. The control device 116 outputs the generated video signal to a video line drive circuit 117b. Further, the control device 116 generates, based on the input video data, a timing signal for synchronizing the video line drive circuit 117b, a scanning line drive circuit 117a, and a backlight drive circuit 118, and outputs the generated timing signal toward the respective drive circuits. Note that, this embodiment is not intended to limit the form of the control device 116 particularly. For example, the control device 116 may be including a plurality of large scale integrations (LSIs) or a single LSI. Further, the control device 116 may not be configured to synchronize between the backlight drive circuit 118 and the other circuits.

The backlight drive circuit 118 is a circuit for supplying a current necessary for the plurality of light emitting diodes 113 serving as light sources of the backlight unit 110. In this embodiment, the control device 116 generates a signal for controlling brightness of the light emitting diode 113 based on input video data, and outputs the generated signal toward the backlight drive circuit 118. Then, in accordance with the generated signal, the backlight drive circuit 118 controls the amount of current flowing through the light emitting diode 113 to adjust the brightness of the light emitting diode 113. The brightness of the light emitting diodes 113 may be adjusted for each of the light emitting diodes 113, or the plurality of light emitting diodes 113 may be divided into some groups and the brightness may be adjusted for each of the groups. Note that, as a method of controlling the brightness of the light emitting diode 113, a pulse width modulation (PWM) method may be employed, in which the brightness is controlled based on a light emission period with a constant current amount. As an alternative method, the current amount may be set constant so as to obtain light with constant light intensity, without controlling the brightness of the light emitting diode 113.

The scanning line drive circuit 117a is connected to the scanning signal lines X formed on the TFT substrate. The scanning line drive circuit 117a selects one of the scanning signal lines X in order in response to the timing signal input from the control device 116, and applies a voltage to the selected scanning signal line X. When the voltage is applied to the scanning signal line X, the TFTs connected to the scanning signal line X are turned on.

The video line drive circuit 117b is connected to the video signal lines Y formed on the TFT substrate. In synchronization with the selection of the scanning signal line X by the scanning line drive circuit 117a, the video line drive circuit 117b applies, to each of the TFTs provided to the selected scanning signal line X, a voltage corresponding to the video signal representing the grayscale value for each of the pixels.

Note that, in this embodiment, the control device 116 and the backlight drive circuit 118 illustrated in FIG. 3 are both formed on the control board 112 of FIG. 2. Further, a liquid crystal panel drive circuit 117 including the scanning line drive circuit 117a and the video line drive circuit 117b is formed on flexible printed circuits (FPCs) electrically connected to the liquid crystal panel 103 (FIG. 3), or formed on a substrate constructing the liquid crystal panel 103 (so-called system-on-glass (SOG)). Note that, the arrangement described above is an example, and the respective circuits are provided at any portions.

Figure 5:
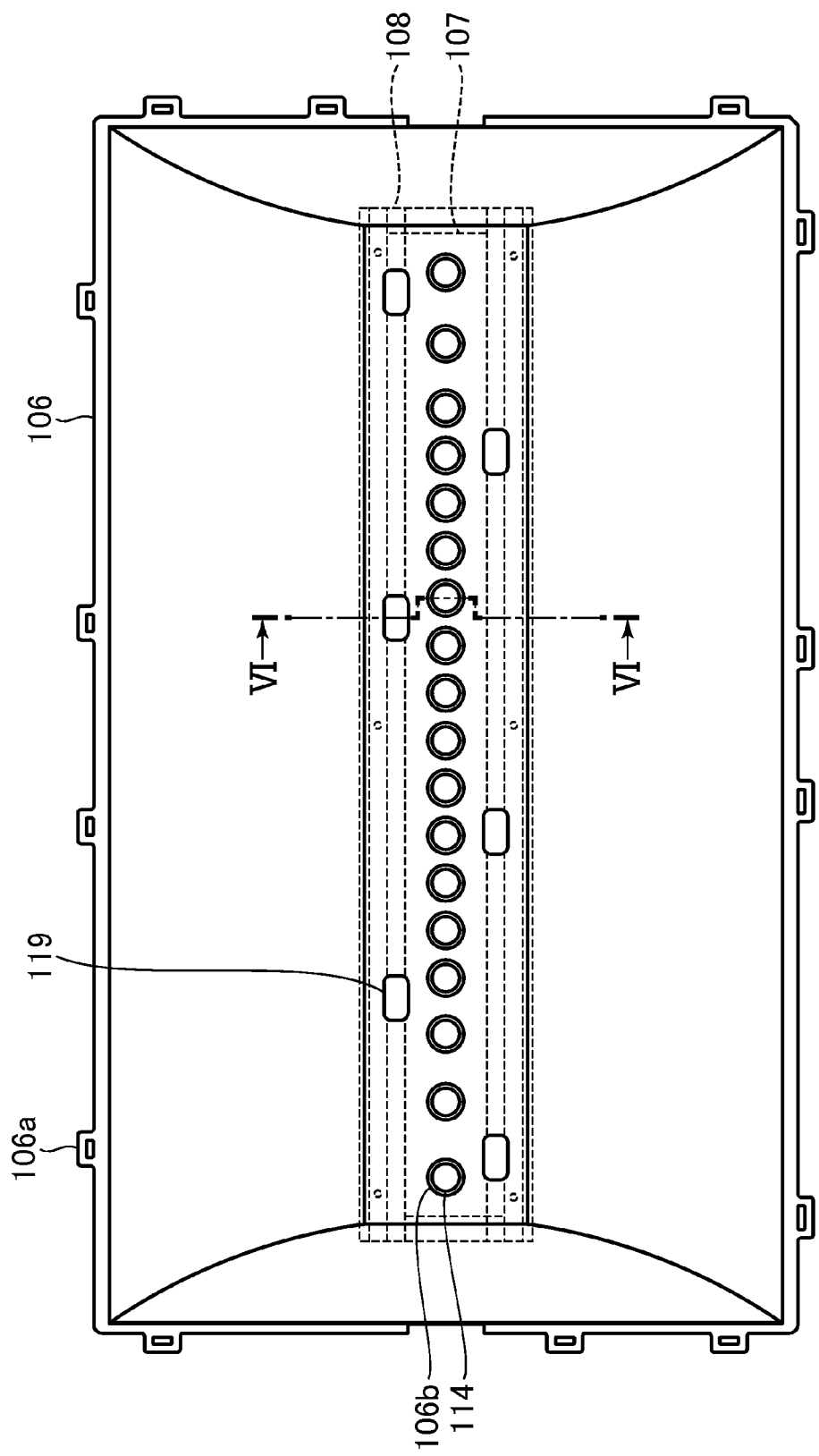
FIG. 5 is a view illustrating a reflection sheet, a light emitting diode substrate, and a radiator plate of the liquid crystal display device as viewed from the front surface side.

FIG. 5 is a view illustrating the reflection sheet 106, the light emitting diode substrate 107, and the radiator plate 108 of the liquid crystal display device as viewed from the front surface side. Note that, in FIG. 5, portions of the light emitting diode substrate 107 and the radiator plate 108 which are hidden behind the reflection sheet 106 are illustrated by broken lines.

On the periphery of the reflection sheet 106, an appropriate number of fixing portions 106a protruding in a tongue shape are provided at appropriate intervals. The fixing portions 106a are used for fixing a peripheral portion of the reflection sheet 106, and in this embodiment, the fixing portions 106a are each provided with a hole for hooking therein a protrusion (not shown) provided to the intermediate frame 104 for fixation. However, the structure of fixing the peripheral portion of the reflection sheet 106 may be of any type.

Further, in a region of the center portion of the reflection sheet 106 in the lateral direction, holes 106b for exposing the lenses 114 to the front surface side of the reflection sheet 106 are provided correspondingly to the array of the lenses 114, that is, the light emitting diodes. Further, the array density of the light emitting diodes is high in the vicinity of the center portion in the longitudinal direction and low in the vicinity of both end portions. In other words, the interval between adjacent light emitting diodes is larger at the peripheral portion of the image formation region than at the center portion of the image formation region. The positions of the lenses 114 and the holes 106b illustrated in FIG. 5 correspond to the positions of the above-mentioned light emitting diodes. Note that, in FIG. 5, only one lens 114 and only one hole 106b are denoted by reference symbols as representatives.

Figure 6:
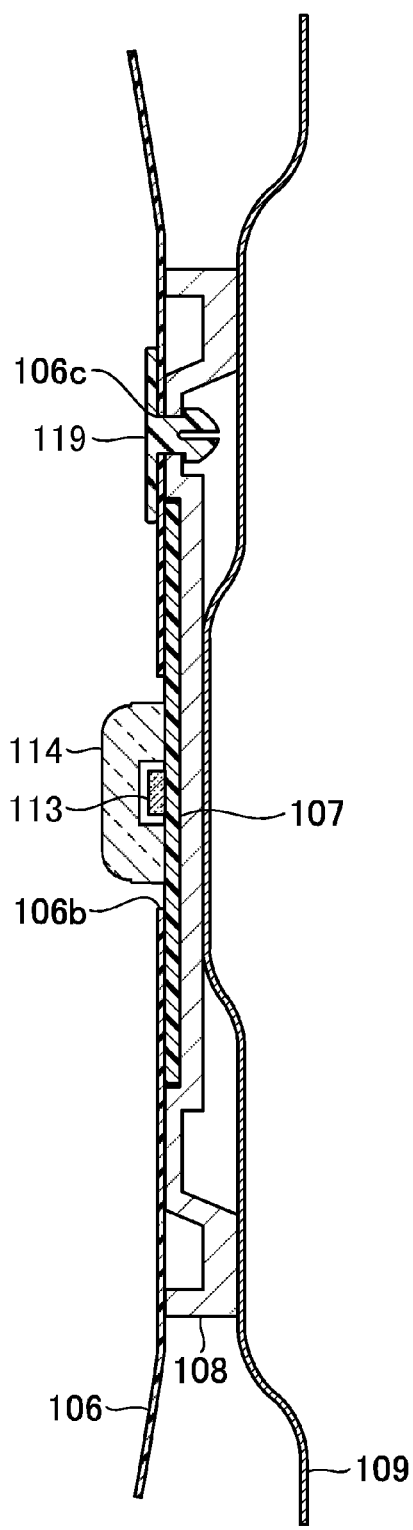
FIG. 6 is a partial enlarged cross-sectional view taken along the line VI-VI of FIG. 5.

FIG. 6 is a partial enlarged cross-sectional view taken along the line VI-VI of FIG. 5. In FIG. 6, the lower frame 109 is also illustrated. The left side in FIG. 6 is the front surface side, and the right side in FIG. 6 is the rear surface side. FIG. 6 illustrates how the light emitting diode 113 mounted onto the light emitting diode substrate 107 and the lens 114 arranged on the front surface of the light emitting diode 113 pass through the hole 106b provided in the reflection sheet 106 and are exposed to the front surface side of the reflection sheet 106. The reflection sheet 106 is further provided with a fixing hole 106c. With a fixture 119 passing through the fixing hole 106c, the reflection sheet 106 is fixed to the radiator plate 108 in a region on the outer side of the light emitting diode substrate 107 in the width direction. The size of the fixing hole 106c is slightly larger than the cross section of a passing portion of the fixture 119, in order to allow for a relative change in dimensions of the respective members caused by different linear expansion coefficients when the light emitting diode 113 generates heat to undergo thermal expansion. Further, the front surface of the light emitting diode substrate 107 and the front surface of the radiator plate 108 are substantially flush with each other, and hence, on the front surface side thereof, the reflection sheet 106 is retained flat without waving. The fixture 119 may be of any type and is not particularly limited. In this embodiment, a fixing pin having a snap-in mechanism is used as illustrated in FIG. 6, which facilitates the fixation of the reflection sheet 106. It is preferred that the material of the fixture 119 be the same as that of the reflection sheet 106 or be a similar white synthetic resin. This minimizes brightness unevenness at the position where the fixture 119 is arranged.

Figure 7:
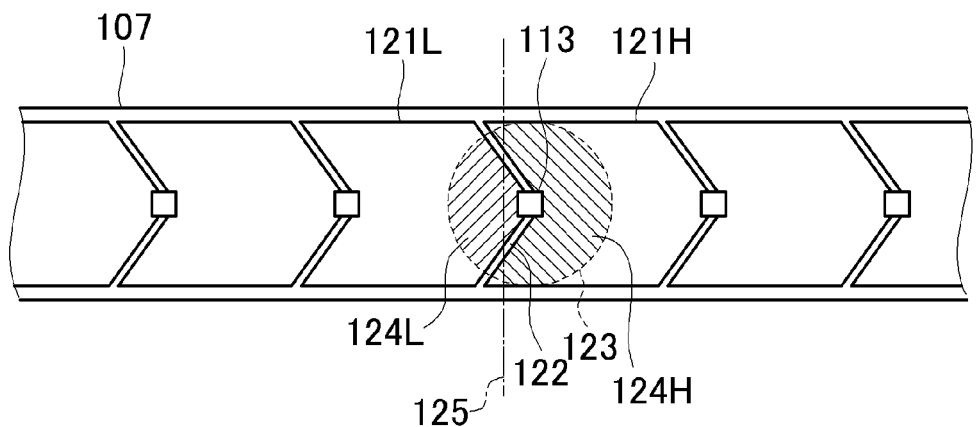
FIG. 7 is a partial enlarged view of the light emitting diode substrate.

FIG. 7 is a partial enlarged view of the light emitting diode substrate 107. FIG. 7 illustrates the vicinity of the center of the light emitting diode substrate 107 illustrated in FIG. 5. Illustration of the lenses is omitted for simple description. As illustrated in FIG. 7, the light emitting diodes 113 are arrayed in the longitudinal direction to form a light emitting diode array. An electrode 121 with a solid pattern is formed between an anode and a cathode of adjacent light emitting diodes 113 to connect the light emitting diodes 113 in series. In FIG. 7, in particular, the light emitting diode 113 illustrated at the center is denoted by reference numeral, and the electrode 121 connected to a low temperature side electrode of this light emitting diode 113 is illustrated as "electrode 121L" while the electrode 121 connected to a high temperature side electrode of this light emitting diode 113 is illustrated as "electrode 121H". A boundary 122 where no electrode 121 is formed is provided between the electrode 121L and the electrode 121H, and both electrodes 121L and 121H are separated from each other to prevent a short circuit. Note that, in this example, the anode is the low temperature side electrode and the cathode is the high temperature side electrode.

In this embodiment, the boundary 122 is non-parallel to the lateral direction (vertical direction of FIG. 7) orthogonal to the longitudinal direction in the plane of the light emitting diode substrate 107, and is inclined toward the electrode 121L connected to the low temperature side electrode, starting from the light emitting diode 113.

Figure 9:
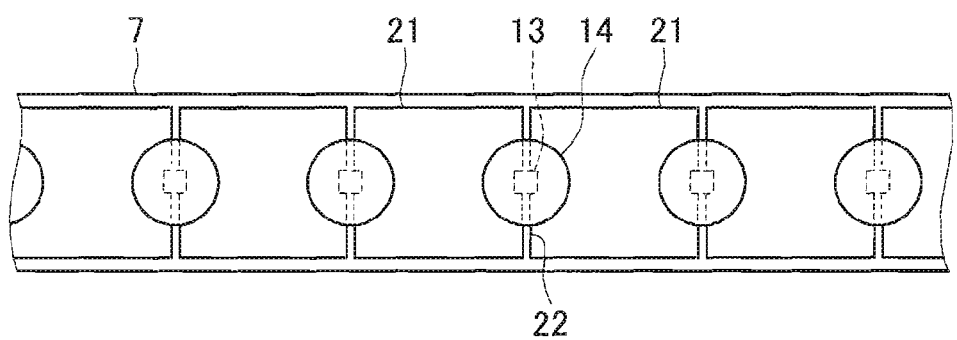
FIG. 9 is a partial enlarged plan view illustrating how a plurality of light emitting diodes are arranged linearly on the light emitting diode substrate.

The reason why the boundary 122 is oriented in such a way is now described. Heat generated by the light emitting diode 113 propagates to the electrodes 121L and 121H via the low temperature side electrode and the high temperature side electrode and is then dissipated through heat exchange with the outside air. In this case, the heat transferred to the electrodes 121L and 121H via the low temperature side electrode and the high temperature side electrode propagates through the planes of the electrodes 121L and 121H radially to be diffused. Thus, the electrodes 121L and 121H have such concentric temperature distributions that the temperature decreases with distance from the low temperature side electrode and the high temperature side electrode with the low temperature side electrode and the high temperature side electrode as the centers. On the other hand, as well known, the magnitude of the heat flux density caused by the heat transfer to the outside air from the electrodes 121L and 121H is proportional to a temperature difference between the electrodes 121L and 121H and the outside air. Thus, when the outside air temperature is regarded as substantially constant due to convection, as the areas of high temperature portions of the electrodes 121L and 121H become larger, the heat transfer to the outside air from the electrodes 121L and 121H becomes larger to improve heat dissipation efficiency. In other words, it is desired that the electrodes 121L and 121H have such a shape that the areas of the high temperature portions close to the light emitting diode 113 serving as a heat source are made as large as possible. As already described above, the amount of heat generation at the high temperature side electrode of the light emitting diode 113 is larger than the amount of heat generation at the low temperature side electrode thereof. Thus, in the vicinity of a certain focused light emitting diode 113, the electrode 121H has a higher temperature. Accordingly, the shape of the electrode 121 is changed between the side connected to the low temperature side electrode and the side connected to the high temperature side electrode, thereby obtaining such a shape that the area of the high temperature portion connected to the high temperature side electrode is made as large as possible. In this manner, heat dissipation efficiency is improved as compared to a case of a shape different from the above-mentioned shape, that is, the shape in which the boundary 122 is parallel to the lateral direction as illustrated in FIG. 9. The shape of the boundary 122 illustrated in FIG. 7 is an example of the shape of the electrode 121 for improving the heat dissipation efficiency in this way. In this shape, an optimal inclination angle of the boundary 122 may be selected depending on the difference between the amounts of heat generation from the low temperature side electrode and the high temperature side electrode of the light emitting diode 113.

The feature of the shape of the electrode 121 for improving the heat dissipation efficiency can be described by various expressions. One example is the above-mentioned expression that the boundary 122 is non-parallel to the lateral direction and is inclined toward the electrode 121L connected to the low temperature side electrode starting from the light emitting diode 113. Alternatively, the following expressions are conceivable.

Specifically, the feature can be described by the expression that, in a circle which is centered at one light emitting diode and whose diameter is the distance from the one light emitting diode to another light emitting diode adjacent to the one light emitting diode, the area of an electrode connected to the high temperature side electrode of the one light emitting diode is larger than the area of an electrode connected to the low temperature side electrode of the one light emitting diode. This is described with reference to FIG. 7. When considering a circle 123 (illustrated by broken line in FIG. 7) which is centered at the light emitting diode 113 and whose diameter is the distance to an adjacent light emitting diode, the area of a portion 124H (illustrated by hatching in FIG. 7) of the electrode 121H included in the circle 123 and connected to the high temperature side electrode of the light emitting diode 113 is larger than the area of a portion 124L (illustrated by hatching in FIG. 7) of the electrode 121L included in the circle 123 and connected to the low temperature side electrode of the light emitting diode 113.

Alternatively, the feature can be described by the expression that the electrode 121L and the electrode 121H are shaped to partially overlap with each other in the lateral direction. This is described with reference to FIG. 7. When considering a particular straight line extending in the lateral direction, specifically, a straight line 125 (illustrated by dashed line in FIG. 7) on the side of the low temperature side electrode of the light emitting diode 113 in the illustrated example, the straight line 125 intersects with both the electrode 121L and the electrode 121H.

Note that, the example of FIG. 7 illustrated as this embodiment satisfies all the above-mentioned features simultaneously, but all the features are not always required to be satisfied. It is only necessary that any one of the features be satisfied.

The light emitting diodes 113 in the above description are linearly arranged in one row in the longitudinal direction, but the arrangement is not always limited thereto. The light emitting diodes 113 may be arranged in a plurality of rows in the longitudinal direction.

Figure 8:
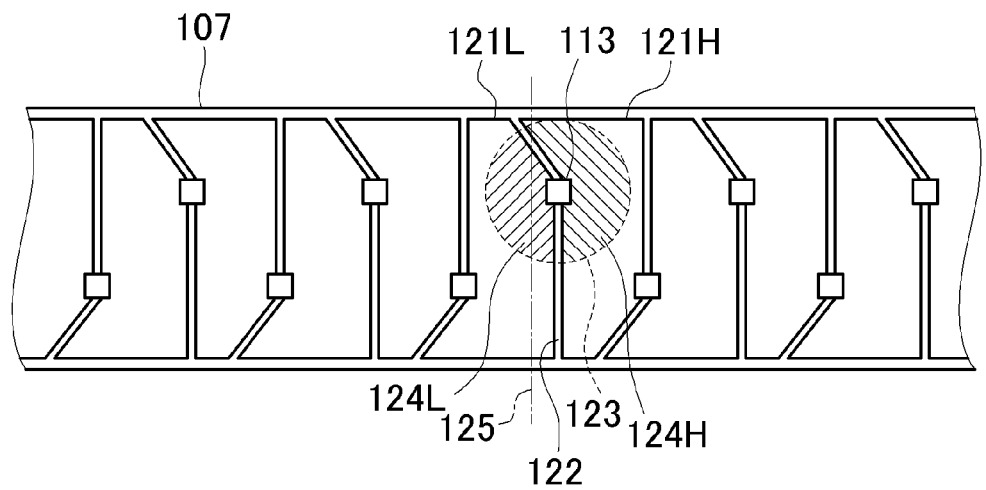
FIG. 8 is a partial enlarged view of the light emitting diode substrate according to a modified example where the light emitting diodes are arranged in two rows in a longitudinal direction.

FIG. 8 illustrates such an example, which is a partial enlarged view of the light emitting diode substrate 107 according to a modified example where the light emitting diodes 113 are arranged in two rows in the longitudinal direction. Also in this case, similarly to the above-mentioned example, at least a part of the boundary 122 is non-parallel to the lateral direction, and is inclined toward the electrode 121L connected to the low temperature side electrode, starting from the light emitting diode 113. In the circle 123 which is centered at the light emitting diode 113 and whose diameter is the distance to an adjacent light emitting diode, the area of the portion 124H of the electrode 121H connected to the high temperature side electrode of the light emitting diode 113 is larger than the area of the portion 124L of the electrode 121L connected to the low temperature side electrode of the light emitting diode 113. Further, the electrode 121L and the electrode 121H partially overlap with each other in the lateral direction, and the straight line 125 extending in the lateral direction intersects with both the electrode 121L and the electrode 121H.

Subsequently, a second embodiment of the present application is described with reference to the accompanying drawings.

Figure 10:
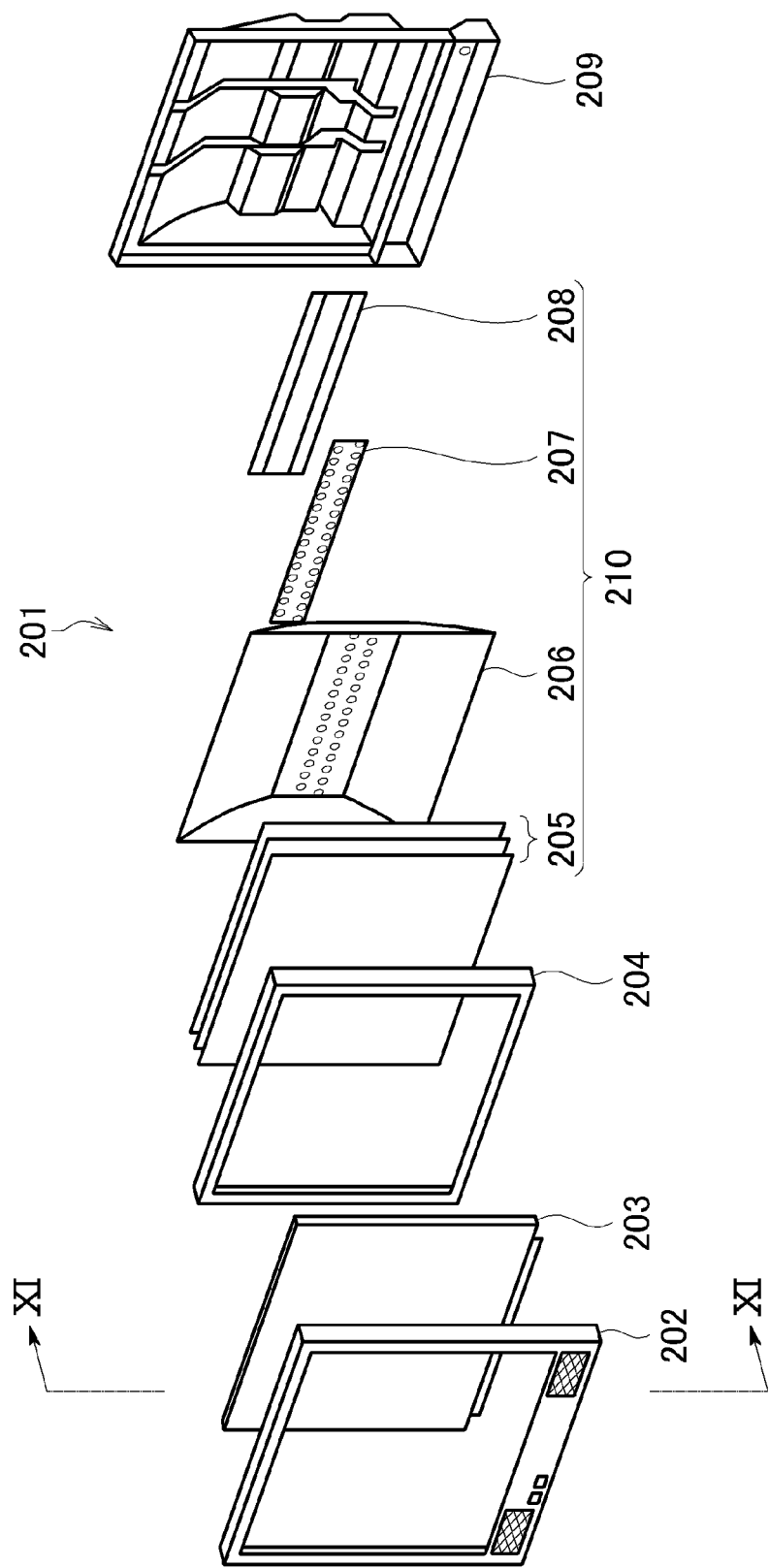
FIG. 10 is an exploded perspective view of a liquid crystal display device according to a second embodiment of the present application.

FIG. 10 is an exploded perspective view of a liquid crystal display device 201 according to this embodiment. As illustrated in FIG. 10, the liquid crystal display device 201 is assembled by arranging, in order from the front side, an upper frame 202, a liquid crystal panel 203, an intermediate frame 204, an optical sheet group 205, a reflection sheet 206, a light emitting diode substrate 207, a radiator plate 208, and a lower frame 209. Note that, the optical sheet group 205, the reflection sheet 206, the light emitting diode substrate 207, and the radiator plate 208 together construct a backlight unit 210 that functions as a planar light source for illuminating the liquid crystal panel 203 from the rear surface side thereof. FIG. 10 illustrates only structural components of the liquid crystal display device 201 and omits other components, such as a control board and a speaker.

Figure 11:
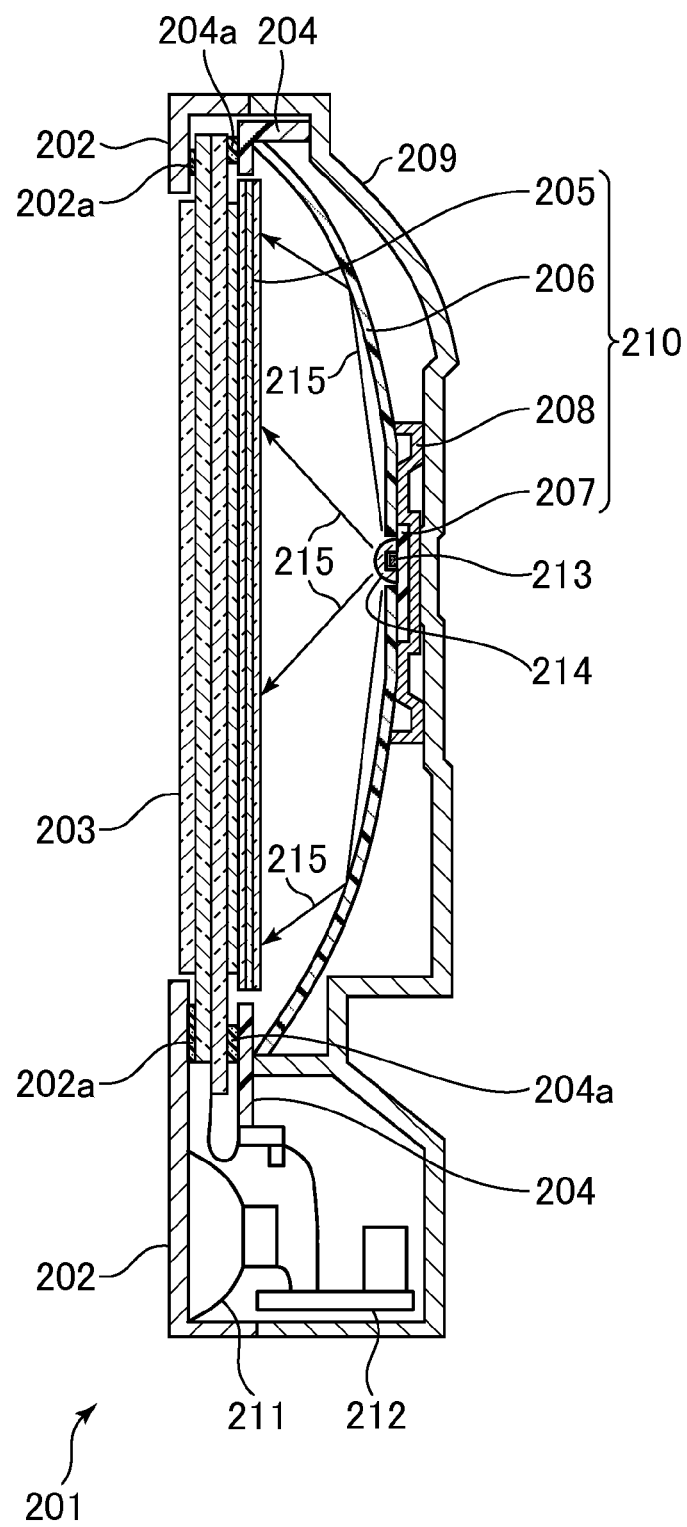
FIG. 11 is a schematic cross-sectional view of the liquid crystal display device taken along the line XI-XI of FIG. 10.

FIG. 11 is a schematic cross-sectional view of the liquid crystal display device 201 taken along the line XI-XI of FIG. 10. FIG. 11 illustrates a schematic cross-section of the assembled liquid crystal display device 201. As illustrated in FIG. 11, the liquid crystal display device 201 is structured to store the liquid crystal panel 203 and the backlight unit 210 in an outer frame formed of the upper frame 202 and the lower frame 209. The intermediate frame 204 is provided between the liquid crystal panel 203 and the backlight unit 210 so that the liquid crystal panel 203 and the backlight unit 210 are retained independently. The left side in FIG. 11 is the front side, and the right side, which is the opposite side of the front side, is the rear surface side.

Note that, the liquid crystal display device 201 exemplified in this embodiment is a television receiver. Therefore, the liquid crystal display device 201 includes components for functioning as a television receiver, such as a speaker 211 illustrated in FIG. 11. Further, a control board 212 illustrated in FIG. 11 includes a power supply, a control circuit for the liquid crystal panel 203, and a control circuit for the backlight unit 210, as well as a circuit such as a tuner for receiving television broadcast. Note that, the liquid crystal display device 201 is not necessarily a television receiver, and may be a computer monitor, for example. In this case, the liquid crystal display device 201 may omit the components for functioning as a television receiver.

The upper frame 202 and the lower frame 209 construct a housing for storing the liquid crystal panel 203 and the backlight unit 210, and it is preferred that the upper frame 202 and the lower frame 209 be formed of a lightweight material having high rigidity. Examples of the material that may be used for the upper frame 202 and the lower frame 209 are metals, such as a steel plate, an aluminum alloy, and a magnesium alloy, FRP, and various kinds of synthetic resins. It is particularly preferred that the lower frame 209 be formed of a material having high heat conductivity in order to dissipate the heat generated due to light emission of the light emitting diodes efficiently, which is conducted from the light emitting diode substrate 207 via the radiator plate 208. In this embodiment, a steel plate is used. The material of the upper frame 202 may be the same as that of the lower frame 209 or may be different, and can be determined as appropriate considering the size, intended use, appearance, weight, and other factors of the liquid crystal display device 201. A buffer 202a is provided on the surface of the upper frame 202 facing the liquid crystal panel 203, so as to mitigate the shock occurring when the liquid crystal panel 203 swings due to vibration or the like and comes in contact with the upper frame 202. As the buffer 202a, an appropriate rubber, resin, sponge, or the like is used. It is to be understood that the support and buffer structure of the liquid crystal panel 203 described herein is an example.

The intermediate frame 204 is a member that retains the liquid crystal panel 203 and the backlight unit 210 independently in a separate manner. On the front surface of the intermediate frame 204, a buffer 204a is provided so as to mitigate the shock occurring when the liquid crystal panel 203 swings and comes in contact with the intermediate frame 204. As the buffer 204a, an appropriate rubber, resin, sponge, or the like is used. Note that, the structure of the intermediate frame 204 described herein is an example. The intermediate frame 204 may employ any structure that appropriately supports the liquid crystal panel 203 and the backlight unit 210, and may be omitted as occasion demands.

Also the material of the intermediate frame 204 is not particularly limited, but it is preferred to use a synthetic resin in terms of moldability and cost. In this embodiment, polycarbonate is used in terms of strength, but the material is not always limited thereto. As in FRP, a reinforcing material may be mixed into a synthetic resin. It is also preferred that the intermediate frame 204 have light blocking properties and therefore be in black or dark color. The coloring of the intermediate frame 204 may be attained by a black or dark color material itself or by coating the surface of the intermediate frame 204. In this embodiment, the intermediate frame 204 is obtained by molding polycarbonate that is colored in black or dark color.

The backlight unit 210 includes the optical sheet group 205, the reflection sheet 206, the light emitting diode substrate 207, and the radiator plate 208. The light emitting diode substrate 207 in this embodiment is an elongated substrate on which a plurality of light emitting diodes 213 are linearly mounted, and is provided so that a longitudinal direction of the light emitting diode substrate 207 is aligned with a longitudinal direction of the liquid crystal display device 201. The light emitting diode substrate 207 is fixed to the radiator plate 208. In this case, the light emitting diode 213 in this embodiment is a so-called light emitting diode package in which a light emitting diode chip is sealed with a sealing resin, and is mounted onto the light emitting diode substrate 207. However, this is not a limitation, and as another example, a light emitting diode chip may be formed directly on the light emitting diode substrate 207. A lens 214 is an optical component for diffusing a light beam emitted from the light emitting diode 213 so as to obtain illumination with uniform brightness over an entire image formation region of the liquid crystal panel 203.

Note that, the light emitting diode substrate 207 in this embodiment is sized so that the length in the longitudinal direction is slightly smaller than the length of the liquid crystal panel 203 in a corresponding direction, about 70% to 80% in this embodiment. The length of the light emitting diode substrate 207 in the lateral direction is smaller than the length of the liquid crystal panel 203 in the lateral direction, preferably half or less, and in this embodiment, roughly about 10% to 20%. Any insulating material can be used for the light emitting diode substrate 207 without any particular limitation, and the light emitting diode substrate 207 may be formed of an insulating material such as glass epoxy, paper phenol, and paper epoxy, or a metal with insulating coating. Note that, in this embodiment, the longitudinal direction of the light emitting diode substrate 207 is the direction parallel to the long side of the liquid crystal panel, but instead, the direction parallel to the short side of the liquid crystal display device 201 may be defined as the longitudinal direction. Further, the above-mentioned specific dimensions of the light emitting diode substrate 207 are an example, and may be arbitrarily changed depending on the design of the liquid crystal display device 201.

The reflection sheet 206 is a member for reflecting light from the light emitting diodes 213 to irradiate the rear surface of the liquid crystal panel 203 with light uniformly. The reflection sheet 206 has a curved cross-section as illustrated in FIG. 11. A light beam from the light emitting diode 213 is diffused in the vertical direction by the lens 214 provided on the front surface of the light emitting diode 213. As indicated by arrows 215 of FIG. 11, the light beam enters directly the optical sheet group 205, or is reflected on the reflection sheet 206 to enter the optical sheet group 205. The reflection sheet 206 and the optical sheet group 205 have the sizes corresponding to the liquid crystal panel 203, and hence the liquid crystal panel 203 is illuminated uniformly from the rear surface side thereof.

The reflection sheet 206 has the size corresponding to the liquid crystal panel 203 as described above, and has a curved shape to be recessed as viewed from the front surface side. The reflection sheet 206 is provided with holes at positions at which the light emitting diodes 213 are arranged, so as to expose the light emitting diodes 213 to the front surface side of the reflection sheet 206. The material of the reflection sheet 206 is not particularly limited, and a white reflection sheet using a PET resin or the like or a mirrored reflection sheet may be used. In this embodiment, a white reflection sheet is used. The optical sheet group 205 is a plurality of optical films including a diffusion sheet for diffusing light entering from the light emitting diodes 213, a prism sheet for refracting light beams toward the front surface side, and the like.

The radiator plate 208 is a metal plate to which the light emitting diode substrate 207 is mounted and which retains the reflection sheet 206. The radiator plate 208 itself is fixed to the lower frame 209. It is preferred that the material of the radiator plate 208 be high in heat conductivity, and various kinds of metal and alloy may be suitable for use. In this embodiment, aluminum is used. A molding method for the radiator plate 208 is not particularly limited, and any method such as pressing and cutting may be used. In this embodiment, the radiator plate 208 is obtained by an extrusion molding method.

Figure 12:
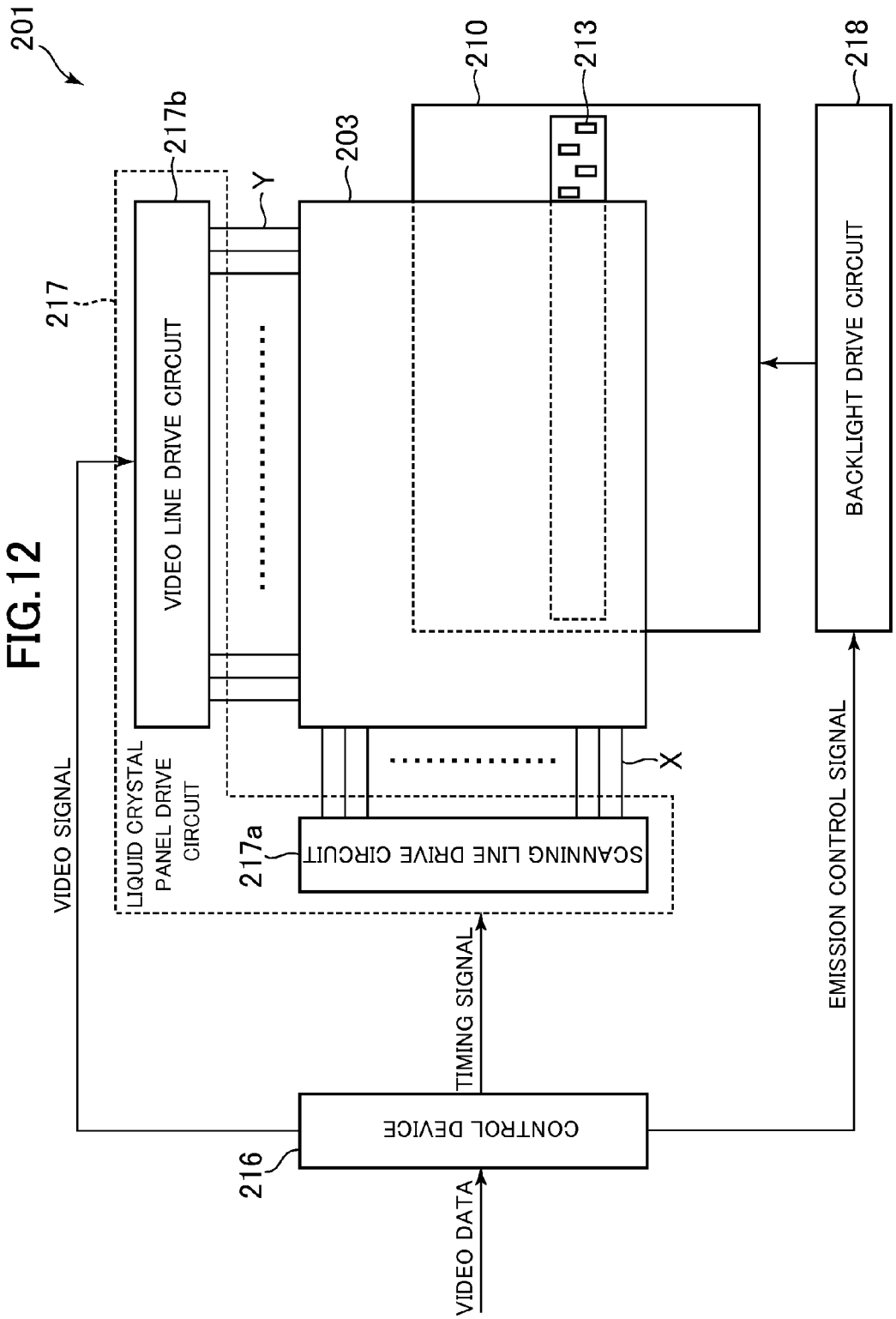
FIG. 12 is a configuration diagram illustrating a configuration of the liquid crystal display device.

FIG. 12 is a configuration diagram illustrating a configuration of the liquid crystal display device 201. Referring to FIG. 12, functions of respective members of the liquid crystal display device 201 are described below.

The liquid crystal panel 203 is rectangular, the lengths of which in the horizontal direction and the vertical direction are determined depending on the intended use of the liquid crystal display device 201. The liquid crystal panel 203 may have a horizontally-elongated shape or a vertically-elongated shape. Alternatively, the lengths in the horizontal direction and the vertical direction may be equal to each other. In this embodiment, the liquid crystal display device 201 is assumed to be used for a television receiver, and hence the liquid crystal panel 203 has a horizontally-elongated shape.

The liquid crystal panel 203 includes a pair of transparent substrates. On a TFT substrate as one of the transparent substrates, a plurality of video signal lines Y and a plurality of scanning signal lines X are formed. The video signal lines Y and the scanning signal lines X are orthogonal to each other to form a grid pattern. A region surrounded by adjacent two video signal lines Y and adjacent two scanning signal lines X corresponds to one pixel.

Note that, the circuit diagram of the pixel formed in the liquid crystal panel 203 in this embodiment is the same as that illustrated in FIG. 4, and the function thereof is also the same.

Returning to FIG. 12, a control device 216 inputs video data received by a tuner or an antenna (both not shown) or video data generated in another device such as a video reproducing device. The control device 216 may be a microcomputer including a CPU and a memory such as a ROM and a RAM. The control device 216 performs various types of image processing, such as color adjustment, with respect to the input video data, and generates a video signal representing a grayscale value for each of the pixels. The control device 216 outputs the generated video signal to a video line drive circuit 217b. Further, the control device 216 generates, based on the input video data, a timing signal for synchronizing the video line drive circuit 217b, a scanning line drive circuit 217a, and a backlight drive circuit 218, and outputs the generated timing signal toward the respective drive circuits. Note that, this embodiment is not intended to limit the form of the control device 216 particularly. For example, the control device 216 may be including a plurality of LSIs or a single LSI. Further, the control device 216 may not be configured to synchronize between the backlight drive circuit 218 and the other circuits.

The backlight drive circuit 218 is a circuit for supplying a current necessary for the plurality of light emitting diodes 213 serving as light sources of the backlight unit 210. In this embodiment, the control device 216 generates a signal for controlling brightness of the light emitting diode 213 based on input video data, and outputs the generated signal toward the backlight drive circuit 218. Then, in accordance with the generated signal, the backlight drive circuit 218 controls an amount of current flowing through the light emitting diode 213 to adjust the brightness of the light emitting diode 213. The brightness of the light emitting diodes 213 may be adjusted for each of the light emitting diodes 213, or the plurality of light emitting diodes 213 may be divided into some groups and the brightness may be adjusted for each of the groups. Note that, as a method of controlling the brightness of the light emitting diode 213, a PWM method may be employed, in which the brightness is controlled based on a light emission period with a constant current amount. As an alternative method, the current amount may be set constant so as to obtain light with constant light intensity, without controlling the brightness of the light emitting diode 213.

The scanning line drive circuit 217a is connected to the scanning signal lines X formed on the TFT substrate. The scanning line drive circuit 217a selects one of the scanning signal lines X in order in response to the timing signal input from the control device 216, and applies a voltage to the selected scanning signal line X. When the voltage is applied to the scanning signal line X, the TFTs connected to the scanning signal line X are turned on.

The video line drive circuit 217b is connected to the video signal lines Y formed on the TFT substrate. In synchronization with the selection of the scanning signal line X by the scanning line drive circuit 217a, the video line drive circuit 217b applies, to each of the TFTs provided to the selected scanning signal line X, a voltage corresponding to the video signal representing the grayscale for each of the pixels.

Note that, in this embodiment, the control device 216 and the backlight drive circuit 218 illustrated in FIG. 12 are both formed on the control board 212 of FIG. 11. Further, a liquid crystal panel drive circuit 217 including the scanning line drive circuit 217a and the video line drive circuit 217b is formed on FPCs electrically connected to the liquid crystal panel 203 (FIG. 12), or formed on a substrate constructing the liquid crystal panel 203 (so-called SOG). Note that, the arrangement described above is an example, and the respective circuits are provided at any portions.

Figure 13:
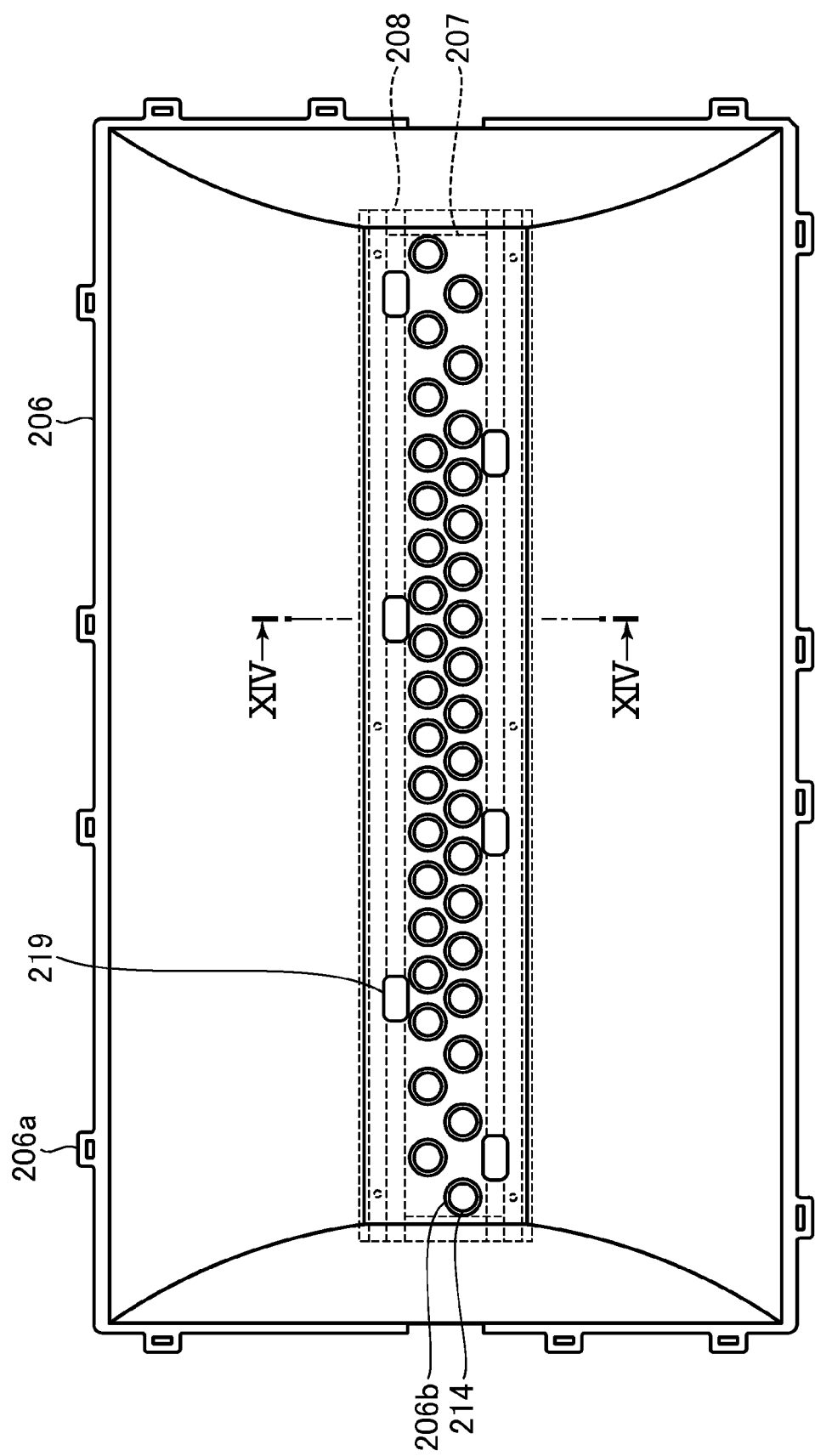
FIG. 13 is a view illustrating a reflection sheet, a light emitting diode substrate, and a radiator plate of the liquid crystal display device as viewed from the front surface side.

FIG. 13 is a view illustrating the reflection sheet 206, the light emitting diode substrate 207, and the radiator plate 208 of the liquid crystal display device as viewed from the front surface side. Note that, in FIG. 13, portions of the light emitting diode substrate 207 and the radiator plate 208 which are hidden behind the reflection sheet 206 are illustrated by broken lines.

On the periphery of the reflection sheet 206, an appropriate number of fixing portions 206a protruding in a tongue shape are provided at appropriate intervals. The fixing portions 206a are used for fixing a peripheral portion of the reflection sheet 206, and in this embodiment, the fixing portions 206a are each provided with a hole for hooking therein a protrusion (not shown) provided to the intermediate frame 204 for fixation. However, the structure of fixing the peripheral portion of the reflection sheet 206 may be of any type.

Further, in a region of the center portion of the reflection sheet 206 in the lateral direction, holes 206b for exposing the lenses 214 to the front surface side of the reflection sheet 206 are provided correspondingly to the array of the lenses 214, that is, the light emitting diodes. The light emitting diodes are arrayed linearly along the longitudinal direction to form a plurality of light emitting diode arrays. In this embodiment, two light emitting diode arrays are provided in parallel to the lateral direction. Note that, the number of light emitting diode arrays only needs to be more than one, and may be three or more. The light emitting diodes belonging to one light emitting diode array are arrayed in a staggered manner with respect to the light emitting diodes belonging to an adjacent light emitting diode array. Further, the array density of the light emitting diodes is high in the vicinity of the center portion in the longitudinal direction and low in the vicinity of both end portions. In other words, the interval between adjacent light emitting diodes is larger at the peripheral portion of the image formation region than at the center portion of the image formation region. The positions of the lenses 214 and the holes 206b illustrated in FIG. 13 correspond to the positions of the above-mentioned light emitting diodes. Note that, in FIG. 13, only one lens 214 and only one hole 206b are denoted by reference symbols as representatives.

Figure 14:
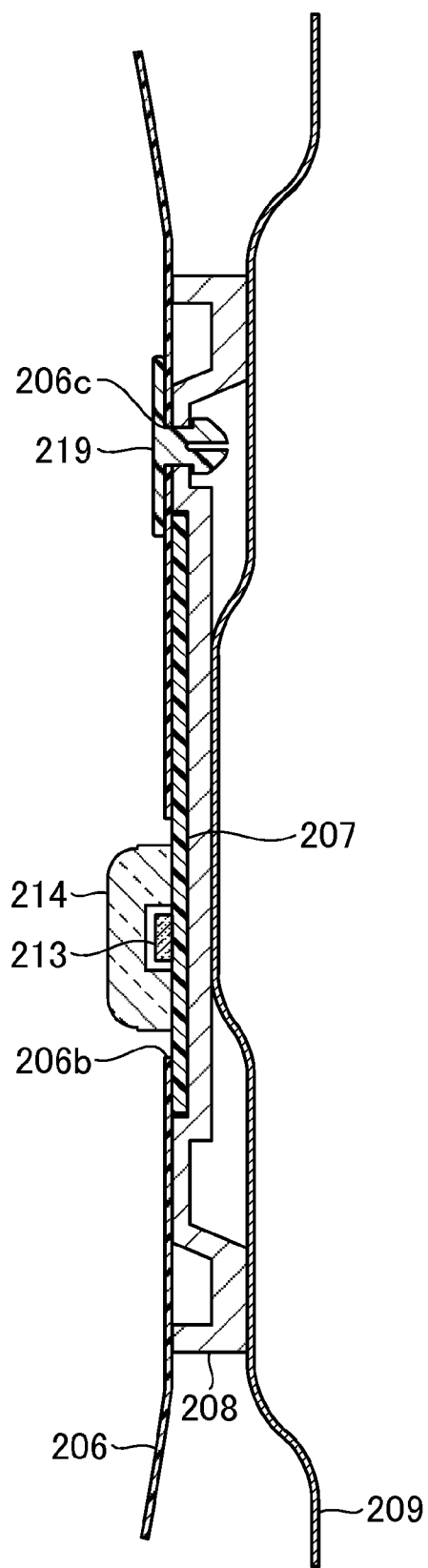
FIG. 14 is a partial enlarged cross-sectional view taken along the line XIV-XIV of FIG. 13.

FIG. 14 is a partial enlarged cross-sectional view taken along the line XIV-XIV of FIG. 13. In FIG. 14, the lower frame 209 is also illustrated. The left side in FIG. 14 is the front surface side, and the right side in FIG. 14 is the rear surface side. FIG. 14 illustrates how the light emitting diode 213 mounted on the light emitting diode substrate 207 and the lens 214 arranged on the front surface of the light emitting diode 213 pass through the hole 206b provided in the reflection sheet 206 and are exposed to the front surface side of the reflection sheet 206. The reflection sheet 206 is further provided with a fixing hole 206c. With a fixture 219 passing through the fixing hole 206c, the reflection sheet 206 is fixed onto the radiator plate 208 in a region on the outer side of the light emitting diode substrate 207 in the width direction. The size of the fixing hole 206c is slightly larger than the cross section of a passing portion of the fixture 219, in order to allow for a relative change in dimensions of the respective members caused by different linear expansion coefficients when the light emitting diode 213 generates heat to undergo thermal expansion. Further, the front surface of the light emitting diode substrate 207 and the front surface of the radiator plate 208 are substantially flush with each other, and hence, on the front surface side thereof, the reflection sheet 206 is retained flat without waving. The fixture 219 may be of any type and is not particularly limited. In this embodiment, a fixing pin having a snap-in mechanism is used as illustrated in FIG. 14, which facilitates the fixation of the reflection sheet 206. It is preferred that the material of the fixture 219 be the same as that of the reflection sheet 206 or be a similar white synthetic resin. This minimizes brightness unevenness at the position where the fixture 219 is arranged.

Figure 15:
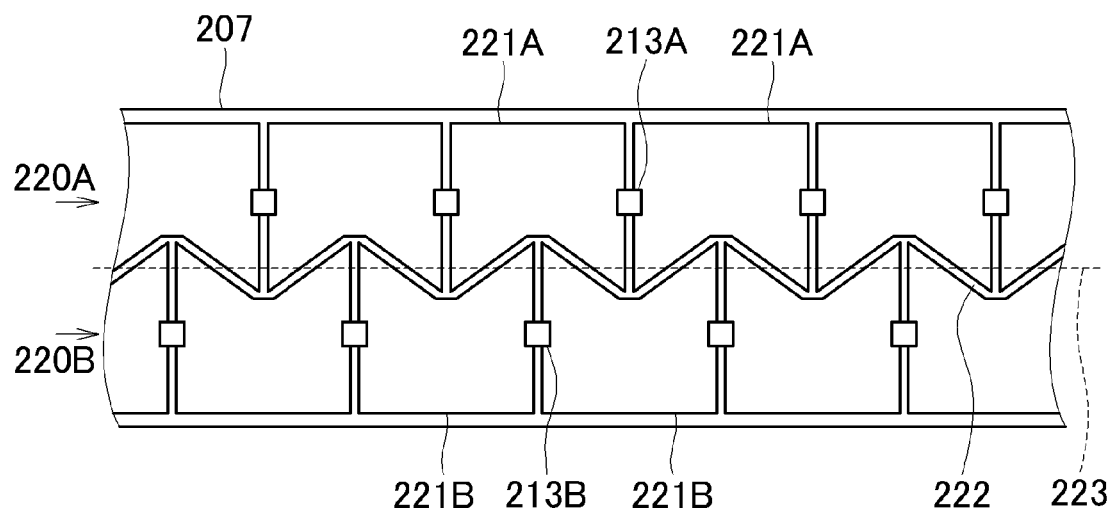
FIG. 15 is a partial enlarged view of the light emitting diode substrate.

FIG. 15 is a partial enlarged view of the light emitting diode substrate 207. FIG. 15 illustrates the vicinity of the center of the light emitting diode substrate 207 illustrated in FIG. 13. Illustration of the lenses is omitted for simple description. As illustrated in FIG. 15, light emitting diodes 213A and light emitting diodes 213B are arrayed in the longitudinal direction to form a light emitting diode array 220A and a light emitting diode array 220B, respectively. Note that, alphabets A and B assigned to reference numeral 213 representing the light emitting diodes indicate that the light emitting diode belongs to the light emitting diode array 220A and the light emitting diode array. 220B, respectively. Further, an electrode 221A with a solid pattern is formed between an anode and a cathode of adjacent light emitting diodes 213A, and an electrode 221B with a solid pattern is formed between an anode and a cathode of adjacent light emitting diodes 213B.

In this case, as illustrated in FIG. 15, a boundary 222 between the electrode 221A belonging to the light emitting diode array 220A and the electrode 221B belonging to the light emitting diode array 220B is not a straight line extending in the longitudinal direction but has a zigzag shape alternately entering the light emitting diode array 220A side and the light emitting diode array 220B side. Accordingly, the electrode 221A and the electrode 221B are shaped to partially overlap with each other in the longitudinal direction. In other words, when considering a particular straight line extending in the longitudinal direction, for example, a straight line 223 (illustrated by broken line in FIG. 15) located in the middle between the light emitting diode array 220A and the light emitting diode array 220B, the straight line 223 intersects with both the electrode 221A and the electrode 221B. The boundary 222 is shaped so that, in regard to a given light emitting diode array, the electrodes enter an adjacent light emitting diode array in the lateral direction at the positions in the longitudinal direction where the light emitting diodes are provided. For example, in regard to the light emitting diode array 220A, the electrodes 221A enter the light emitting diode array 220B side at the positions in the longitudinal direction where the light emitting diodes 213A are provided.

The reason why the electrodes 221A and 221B have such a shape is now described. Heat generated by the light emitting diode 213A or 213B propagates to the electrode 221A or 221B via the anode and cathode and is then diffused through heat exchange with the outside air. In this case, the heat transferred to the electrode 221A or 221B via the anode and the cathode propagates through the plane of the electrode 221A or 221B radially to be diffused. Thus, the electrode 221A or 221B has such a concentric temperature distribution that the temperature decreases with distance from the anode and the cathode with the anode and the cathode as the center. On the other hand, as well known, the heat flux density caused by the heat transfer to the outside air from the electrode 221A or 221B is proportional to a temperature difference between the electrode 221A or 221B and the outside air. Thus, when the outside air temperature is regarded as substantially constant due to convection, as the area of a high temperature portion of the electrode 221A or 221B becomes larger, the heat transfer to the outside air from the electrode 221A or 221B becomes larger to improve heat dissipation efficiency. In other words, it is desired that the electrodes 221A and 221B have such a shape that the areas of the high temperature portions close to the light emitting diodes 213A and 213B serving as heat sources are made as large as possible. In view of the foregoing, in this embodiment, the boundary 222 is formed into a zigzag shape rather than a simple straight line shape. Note that, if it is assumed that the amounts of heat generation from the light emitting diodes 213A and 213B are equal to each other and that there is no difference between the amounts of heat generation from the anode and the cathode, the heat dissipation efficiency is improved most when the boundary 222 has a shape along the perpendicular bisector of a segment connecting adjacent light emitting diodes 213A and 213B. FIG. 15 is a view illustrating this case.

By the way, the above description assumes that the amounts of heat generation from the light emitting diode are equal at the anode and at the cathode. In an actual light emitting diode, however, the amounts of heat generation from the anode and the cathode are often different from each other. One of the anode and the cathode having a larger amount of heat generation with higher temperature is referred to as "high temperature side electrode", and another having a smaller amount of heat generation with relatively lower temperature is referred to as "low temperature side electrode". In this case, it is preferred that the shape of the electrode be varied between the side connected to the high temperature side electrode and the side connected to the low temperature side electrode, thereby obtaining such a shape that the area of the high temperature portion connected to the high temperature side electrode is made as large as possible. Note that, inmost light emitting diodes used at present, the amount of heat generation at the cathode is larger than the amount of heat generation at the anode.

Figure 16:
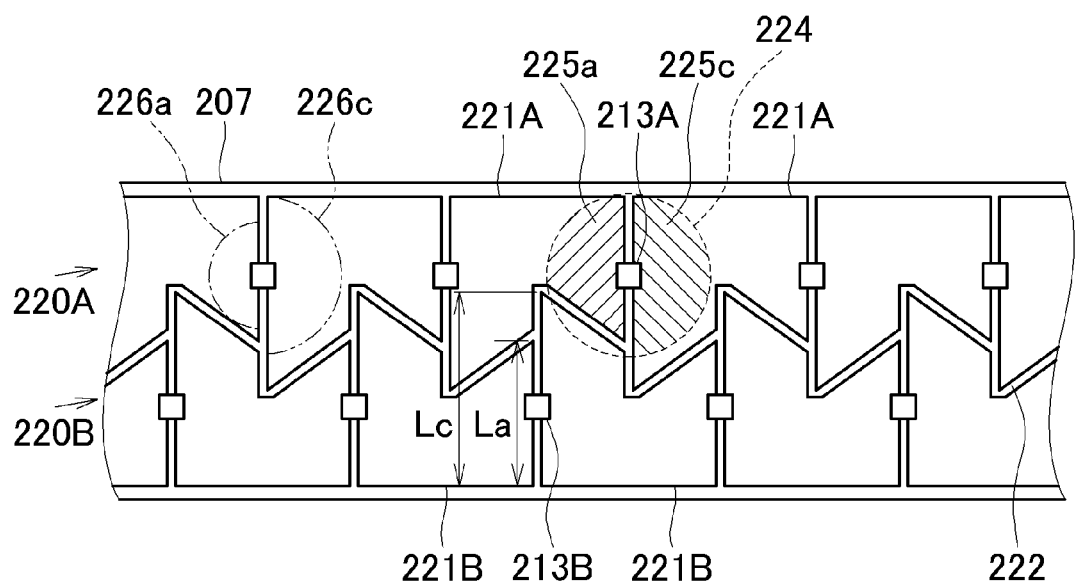
FIG. 16 is a partial enlarged view of the light emitting diode substrate in an example where the amount of generated heat differs between an anode and a cathode of the light emitting diode.

FIG. 16 is a partial enlarged view of the light emitting diode substrate 207 in an example where the amount of heat generation differs between the anode and the cathode of each of the light emitting diodes 213A and 213B. In each of the light emitting diodes 213A and 213B illustrated in FIG. 16, the left side is a low temperature side electrode and the right side is a high temperature side electrode. Thus, the amount of heat generation on the right side of the light emitting diode 213A or 213B corresponding to the high temperature side electrode side is larger than that on the opposite side. Note that, in this example, the anode is the low temperature side electrode and the cathode is the high temperature side electrode.

In this cases, the shape of a boundary 222 between the electrodes 221A and 221B has a saw-tooth shape in which the electrodes 221A and 221B are engaged with each other as illustrated in FIG. 16, and in each of the electrodes 221A and 221B, the area of a portion connected to the high temperature side electrode and located in the vicinity thereof is larger than the area of a portion connected to the low temperature side electrode and located in the vicinity thereof. Also in this shape, similarly to the shape illustrated in FIG. 15, the electrode 221A and the electrode 221B are shaped to partially overlap with each other in the longitudinal direction.

What is important in the electrode shape as represented by the shape illustrated in FIG. 16 for improving heat dissipation efficiency of heat from the light emitting diodes 213A and 213B whose amounts of heat generation are different at the anode and at the cathode is to increase the areas of the high temperature portions of the electrodes 221A and 221B as much as possible. Now, the features of the electrodes 221A and 221B having such a shape are described below with reference to FIG. 16.

The first feature is that, in a circle which is centered at one light emitting diode and whose diameter is the distance from the one light emitting diode to another light emitting diode closest to the one light emitting diode, the area of an electrode connected to a high temperature side electrode of the one light emitting diode is larger than the area of an electrode connected to a low temperature side electrode of the one light emitting diode.

This is described with reference to FIG. 16. When considering a circle 224 (illustrated by broken line in FIG. 16), which is centered at an arbitrary light emitting diode, for example, a light emitting diode denoted by reference symbol 213A, and whose diameter is a distance to an adjacent light emitting diode, that is, a light emitting diode 213B located on the lower left or right side of the light emitting diode 213A in FIG. 16, the area of a portion 225c (illustrated by hatching in FIG. 16) of the electrode 221A included in the circle 224 and connected to the high temperature side electrode of the light emitting diode 213A is larger than the area of a portion 225a (illustrated by hatching in FIG. 16) of the electrode 221A included in the circle 224 and connected to the low temperature side electrode of the light emitting diode 213A.

The second feature is that, in regard to one light emitting diode, the length of a portion of the electrode connected to the high temperature side electrode in the lateral direction is larger than the length of a portion of the electrode connected to the low temperature side electrode in the lateral direction.

This is described with reference to FIG. 16. When considering an arbitrary light emitting diode, for example, a light emitting diode denoted by reference symbol 213B, a length Lc in the lateral direction of the electrode 221B connected to the high temperature side electrode side of the light emitting diode 213B (this electrode 221B is located on the right side of the light emitting diode 213B in FIG. 16) at a portion connected to the high temperature side electrode is larger than a length La in the lateral direction of the electrode 221B connected to the low temperature side electrode side of the light emitting diode 213B (this electrode 221B is located on the left side of the light emitting diode 213B in FIG. 16) at a portion connected to the low temperature side electrode.

The third feature is that the radius of a semicircle which is centered at one light emitting diode and which is inscribed in the electrode on the high temperature side electrode side is larger than the radius of a semicircle which is centered at one light emitting diode and which is inscribed in the electrode on the low temperature side electrode side.

This is described with reference to FIG. 16. When considering an arbitrary light emitting diode, for example, the second light emitting diode 213A from the left in FIG. 16, in a case where a semicircle which is centered at the light emitting diode 213A and which is inscribed in the electrode 221A is drawn, the radius of a semicircle 226c (illustrated by two-dot chain line in FIG. 16) on the high temperature side electrode side is larger than the radius of a semicircle 226a (illustrated by dashed line in FIG. 16) on the low temperature side electrode side.

All the features described above are not always required to be satisfied simultaneously, and it is only necessary that any one of the features be satisfied. It is to be understood that various other shapes than the shape illustrated in FIG. 16 can be appropriately selected as the shape satisfying those features.

Figure 17:
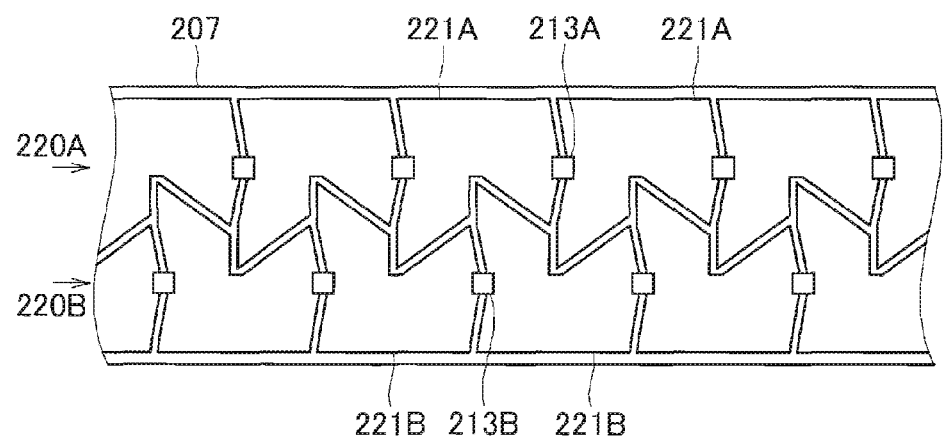
FIG. 17 is a partial enlarged view of the light emitting diode substrate in another example where the amount of generated heat differs between the anode and the cathode of the light emitting diode.
Figure 18:
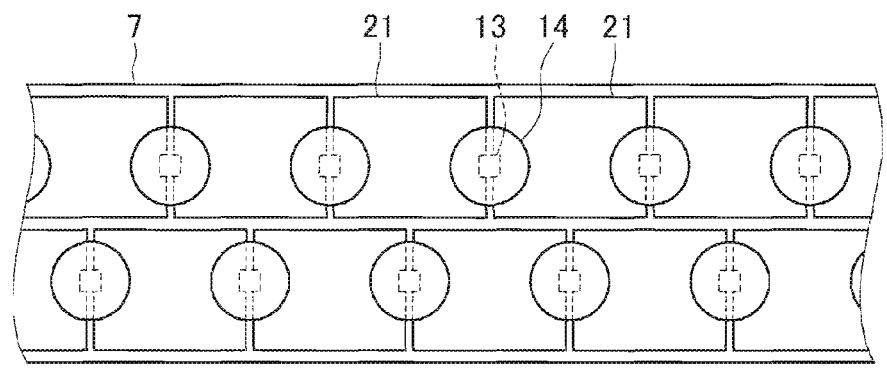
FIG. 18 is a partial enlarged plan view illustrating how a plurality of light emitting diodes are arranged linearly in two rows on the light emitting diode substrate.

Note that, in FIG. 16, the boundary between the electrodes 221A or 221B adjacent across the light emitting diode 213A or 213B is parallel to the lateral direction, but the present invention is not limited thereto. For example, as illustrated in FIG. 17, the boundary between the electrodes 221A or 221B adjacent across the light emitting diode 213A or 213B may be non-parallel to the lateral direction so that the adjacent electrodes 221A or 221B belonging to one light emitting diode array 220A or 220B may be shaped to overlap with each other in the lateral direction. In this case, the terminal having a larger amount of heat generation, specifically, the electrodes 221A and 221B on the high temperature side electrode side in this example are shaped so as to enter the electrodes 221A and 221B on the low temperature side electrode side. In this manner, the areas of the portions on the cathode side where the temperature of the electrodes 221A and 221B becomes higher are increased, and hence heat dissipation efficiency is improved.

Figure 19:
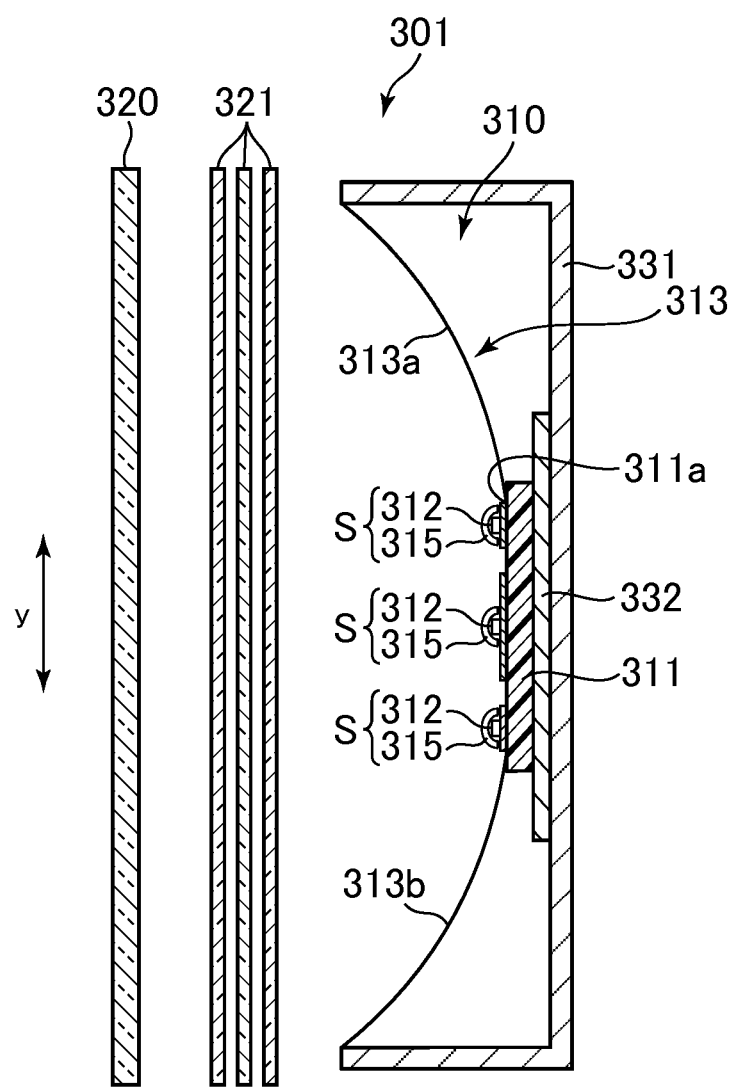
FIG. 19 is a schematic cross-sectional view of a liquid crystal display device according to a third embodiment of the present application.
Figure 20:
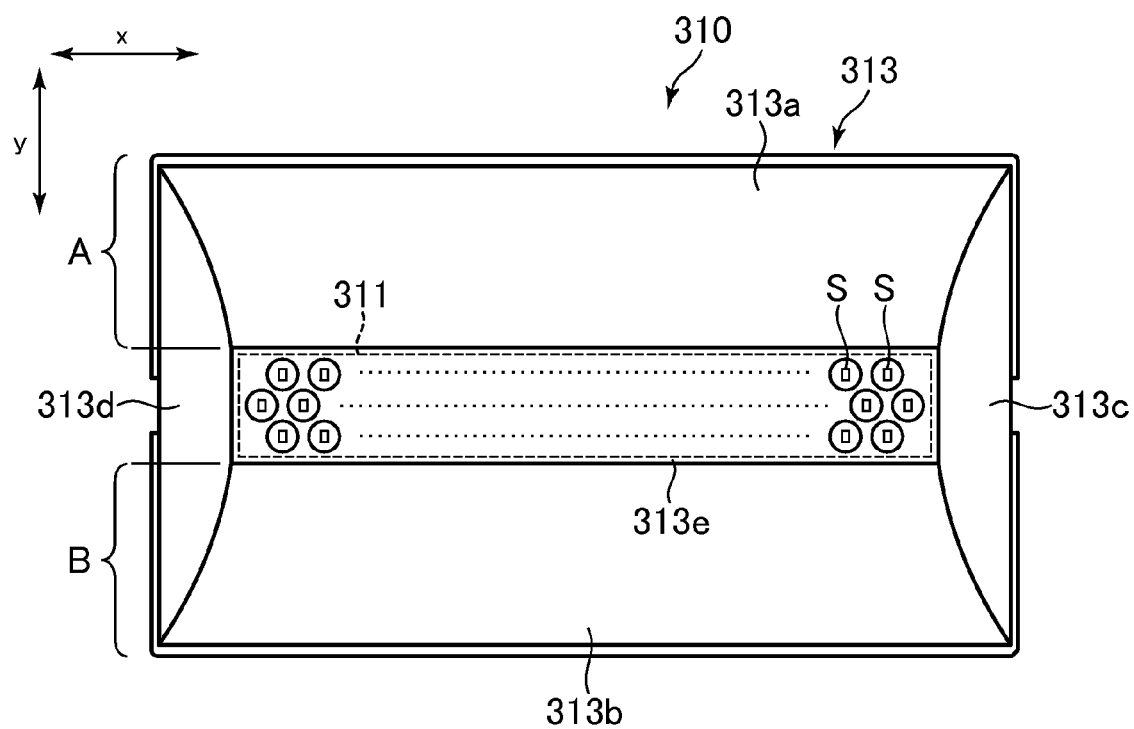
FIG. 20 is a front view of a backlight unit included in the above-mentioned liquid crystal display device.

Further, a third embodiment of the present application is described with reference to the accompanying drawings. FIG. 19 is a schematic cross-sectional view of a liquid crystal display device 301 according to this embodiment. FIG. 20 is a plan view of a backlight unit 310 included in the liquid crystal display device 301.

In the following description, y illustrated in FIG. 20 is the first direction, and x is the second direction orthogonal to the first direction. In the example described herein, the first direction y is the vertical direction of a liquid crystal display panel 320 to be described below, and the second direction x is the horizontal direction of the liquid crystal display panel 320. Note that, the first direction may be defined as the horizontal direction of the liquid crystal display panel 320, and the second direction may be defined as the vertical direction of the liquid crystal display panel 320.

As illustrated in FIG. 19, the liquid crystal display device 301 includes the liquid crystal display panel 320. The liquid crystal display panel 320 has two glass substrates, and liquid crystal is encapsulated therebetween. A TFT, a source signal line, and a gate signal line are formed on one substrate (TFT substrate). A color filter is formed on the other substrate. The gate signal line and the source signal line are pulled to the outside of the liquid crystal display panel 320 and connected to a driver IC. Polarizing plates (not shown) are adhered onto the respective surfaces of the glass substrates. A backlight unit 310 for irradiating the liquid crystal display panel 320 with light is arranged on the rear surface side of the liquid crystal display panel 320. The plurality of optical sheets 321, such as a diffusion sheet and a prism sheet, are arranged between the liquid crystal display panel 320 and the backlight unit 310.

The backlight unit 310 includes a circuit board 311 having a plurality of LEDs 312 serving as light sources mounted thereon. As illustrated in FIG. 20, the circuit board 311 in this example is a substrate elongated in the second direction x, and is arranged at a center part of the backlight unit 310 in the first direction y. The width of the circuit board 311 in the first direction y is smaller than the width of the liquid crystal display panel 320 in the first direction y. The backlight unit 310 has regions A and B in which no light source is provided. The regions A and B are regions on both sides of the circuit board 311 and are located on opposite sides across the circuit board 311 in the first direction y. In this example, the region A is an upper region of the circuit board 311, and the region B is a lower region of the circuit board 311. The widths of the regions A and B in the first direction y are larger than that of the circuit board 311.

As illustrated in FIG. 19, the backlight unit 310 includes a reflection sheet 313 for reflecting light of the LEDs 312 toward the liquid crystal display panel 320. The reflection sheet 313 is formed so as to avoid the positions of the plurality of LEDs 312, and is arranged above the circuit board 311. In this example, as illustrated in FIG. 20, the reflection sheet 313 has holes formed therein at the positions of the LEDs 312, and the LEDs 312 are arranged inside the respective holes. Note that, holes elongated in the second direction x may be formed in the reflection sheet 313, and the plurality of LEDs 312 may be arranged inside the respective holes.

As illustrated in FIG. 19, the reflection sheet 313 has a concave shape that opens toward the liquid crystal display panel 320. The circuit board 311 is located at the bottom of the reflection sheet 313. With such a shape of the reflection sheet 313, the entire surface of the liquid crystal display panel 320 can be irradiated with light of the plurality of LEDs 312. The reflection sheet 313 has a flat surface (hereinafter referred to as "bottom surface") 313e at the bottom thereof (see FIG. 20). The circuit board 311 is arranged on the rear surface side of the bottom surface 313e. Holes for arranging the plurality of LEDs 312 therein are formed in the bottom surface 313e.

In the reflective sheet 313, an upper portion 313a (portion belonging to the above-mentioned region A) and a lower portion 313b (portion belonging to the above-mentioned region B) each approach the liquid crystal display panel 320 while being spread in the first direction y from the bottom surface 313e. In the example illustrated in FIG. 19, the upper portion 313a and the lower portion 313b are curved to approach the liquid crystal display panel 320. In this example, as illustrated in FIG. 20, a right portion 313c and a left portion 313d of the reflective sheet 313 also each approach the liquid crystal display panel 320 while being spread from the bottom surface 313e. In this example, the right portion 313c and the left portion 313d are flat oblique surfaces. Note that, the shape of the reflective sheet 313 is not limited thereto. For example, the upper portion 313a and the lower portion 313b may be oblique surfaces that are not curved.

As illustrated in FIG. 19, in this example, the lens 315 is arranged on each LED 312. The pair of the LED 312 and the lens 315 constructs one point light source S. The lens 315 is formed of an acrylic resin, for example. The lens 315 has a function of expanding light of the LED 312 in the first direction y. In other words, the irradiation angle of the light is expanded by the lens 315 in the vertical direction. Thus, a part of the light of the LED 312 is directed to the upper portion 313a and the lower portion 313b of the reflective sheet 313, and is reflected on those portions 313a and 313b toward the liquid crystal display panel 320. As a result, a wide area of the liquid crystal display panel 320 is irradiated with light. As described above, the right portion 313c and the left portion 313d of the reflective sheet 313 are inclined toward the liquid crystal display panel 320. Light of the LED 312 directed to the right portion 313c and the left portion 313d is reflected on those portions 313c and 313d toward the liquid crystal display panel 320.

As illustrated in FIG. 19, the liquid crystal display device 301 includes a back cabinet 331 for storing the reflective sheet 313 and the circuit board 311. The circuit board 311 is fixed onto the back cabinet 331. In this example, a radiator plate 332 having the size corresponding to the circuit board 311 is arranged on the rear surface of the circuit board 311, and the circuit board 311 is fixed onto the back cabinet 331 via the radiator plate 332. In other words, the circuit board 311 is fixed onto the radiator plate 332, and the radiator plate 332 is fixed onto the back cabinet 331. Heat of the circuit board 311 is released through connection plates 314A and 314B to be described later and the radiator plate 332.

Figure 21:
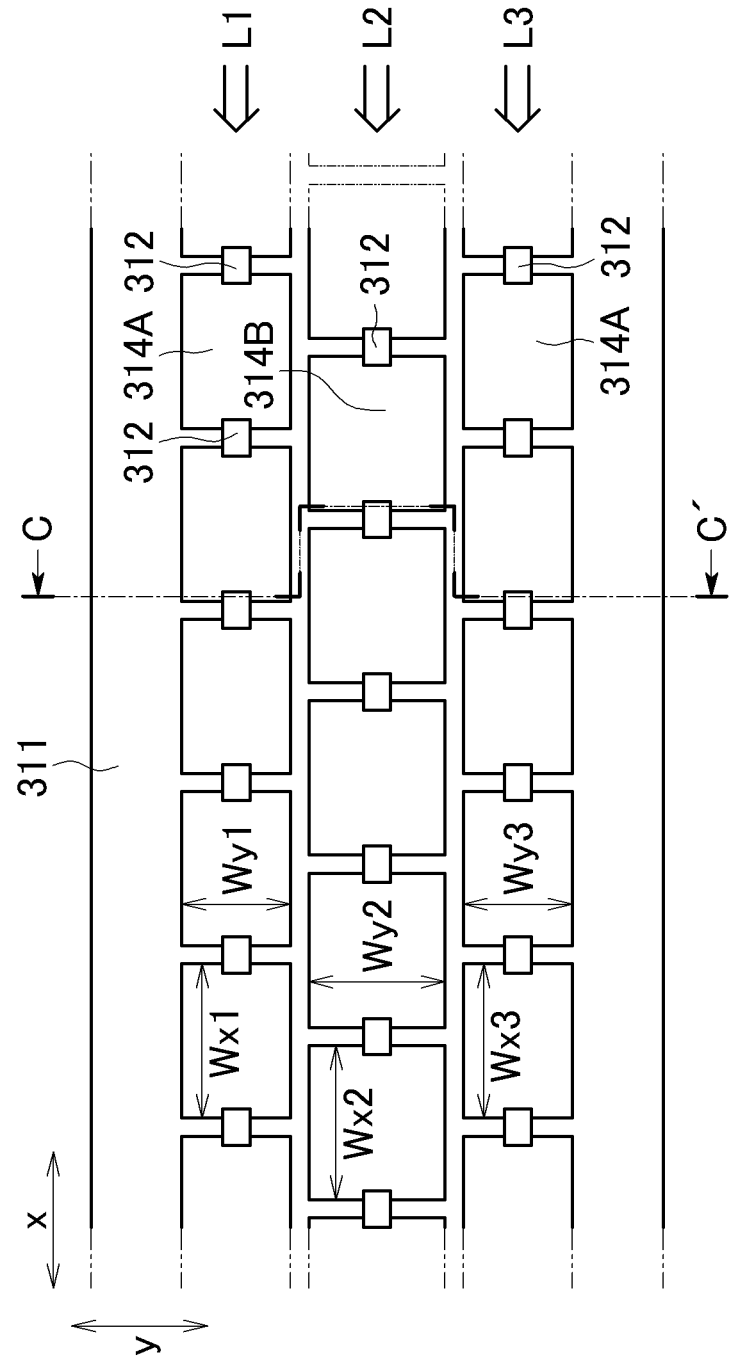
FIG. 21 is a plan view of a circuit board included in the above-mentioned backlight unit.

As described above, the circuit board 311 in this example is a board elongated in the second direction x. FIG. 21 is a plan view illustrating an example of the circuit board 311. In FIG. 21, the above-mentioned lenses 315 are omitted. The plurality of LEDs 312 are arranged on the circuit board 311 in three rows in the second direction x. In this example, the plurality of LEDs 312 are arranged at equal intervals in the second direction x. Note that, the arrangement density of the LEDs 312 may vary in the second direction x. For example, the interval between two adjacent LEDs 312 may be gradually enlarged more at the side in the right or left direction.

The plurality of connection plates 314A and 314B are arranged on the circuit board 311. Each of the connection plates 314A and 314B is arranged between two LEDs 312 adjacent in the second direction x, and electrically connects the two LEDs to each other. In other words, each LED 312 is arranged over two connection plates 314A or 314B adjacent in the second direction x. One edge of each of the connection plates 314A and 314B is connected to a cathode of one LED 312 of the two LEDs 312, and the other edge is connected to an anode of the other LED 312 of the two LEDs 312. With this structure, the plurality of LEDs 312 are connected to one another via the connection plates 314A and 314B. The LEDs 312 and the connection plates 314A and 314B are all arranged on a front surface 311a of the circuit board 311 that faces the liquid crystal display panel 320.

The connection plates 314A and 314B are formed of a metal foil such as copper. The connection plates 314A and 314B are formed to have the function of emitting heat of the LEDs 312. In general, the temperature of the LED is higher on the cathode side than on the anode side. Accordingly, the connection plates 314A and 314B are used for decreasing the temperature on the cathode side, in particular. In this example, as illustrated in FIG. 21, the connection plates 314A and 314B are rectangles larger than the LEDs 312 in plan view.

Each of the connection plates 314A and 314B is formed by, for example, the same step as the step of forming a wiring pattern on the circuit board. Specifically, the connection plates 314A and 314B are formed on the circuit board 311 by plating with a metal foil and thereafter partially removing the metal foil by etching. Note that, a metal foil formed as a separate member from the circuit board 311 may be adhered onto the circuit board 311 as the connection plates 314A and 314B.

As described above, the circuit board 311 in the example illustrated in FIG. 21 includes the plurality of LEDs 312 arranged in three rows. The circuit board 311 has three parallel rows L1, L2, and L3 as rows composed of the LEDs 312 and the connection plate 314A or 314B. The three rows L1, L2, and L3 are arranged in the first direction y. The rows L1 and L3 are two rows on both sides, that is, two rows on edge sides. The row L2 is a row between the rows L1 and L3 (hereinafter referred to as "middle row").

When the circuit board 311 has three or more rows, the temperature of the LEDs 312 arranged in the middle row L2 tends to be higher. To deal with this, in this embodiment, the plurality of connection plates 314B arranged in the row L2 are larger than the connection plates 314A arranged in the two rows L1 and L3 on both sides in plan view of the circuit board 311. Specifically, the area of the connection plate 314B is larger than the area of the connection plate 314A. In this example, a width Wy2 of the connection plate 314B in the first direction y is larger than widths Wy1 and Wy3 of the connection plates 314A in the first direction y. On the other hand, a width Wx2 of the connection plate 314B in the second direction x is equal to widths Wx1 and Wix3 of the connection plates 314A in the second direction x. In other words, the connection plate 314B has a shape obtained by extending the connection plate 314A in the first direction y. Thus, the intervals between two LEDs adjacent in the second direction x are equal among the row L1, the row L2, and the row L3.

Note that, in the example illustrated in FIG. 21, the width Wy1 of the connection plate 314A in the row L1 and the width Wy3 of the connection plate 314A in the row L3 are equal to each other. Alternatively, however, the width Wy1 of the connection plate 314A in the row L1 and the width Wy3 of the connection plate 314A in the row L3 may be different from each other.

As illustrated in FIG. 21, the positions of the LEDs 312 in one of two adjacent rows are offset in the second direction x with respect to the positions of the LEDs 312 in the other row. This arrangement can suppress the accumulation of heat in the vicinity of the cathode of each LED 312. In this example, the positions of the LEDs 312 in one row are offset with respect to the positions of the LEDs 312 in the other row by a half distance of the interval of the LEDs 312. Thus, the LEDs 312 in the row L2 are each located on a straight line passing through an intermediate position of two LEDs 312 arranged in the respective rows L1 and L3.

Figure 22:
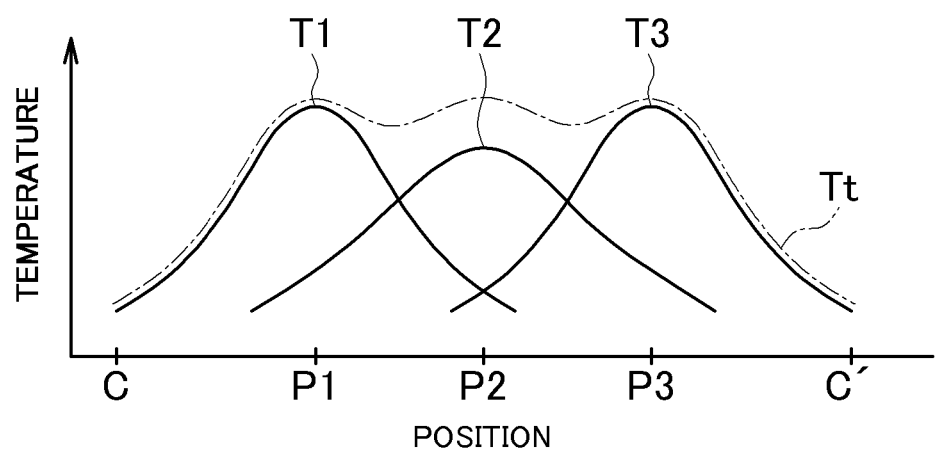
FIG. 22 is a graph schematically showing temperature distributions along the line C-C' illustrated in FIG. 21.

FIG. 22 is a graph schematically showing temperature distributions along the line C-C' illustrated in FIG. 21. In FIG. 22, the solid lines T1, T2, and 13 individually represent temperature distributions caused by heat from the LEDs 312 in the row L1, the LEDs 312 in the row L2, and the LEDs 312 in the row L3. The dashed line Tt represents a temperature distribution caused by heat from the LEDs 312 in all the rows. Note that, the line C-C' is the line passing on the cathode side of the LEDs 312.

As represented by the solid lines T1, T2, and T3 of FIG. 22, in the temperature distributions caused by heat from the LEDs 312 in the respective rows L1, L2, and L3, the temperature becomes the highest at positions P1, P2, and P3 at which the LEDs 312 are arranged, and the temperature decreases in accordance with the distances from the positions P1, P2, and P3. As described above, the width of the connection plate 314B is larger than the width of the connection plate 314A. Thus, as represented by the solid line T2, the temperature distribution caused by heat from the LEDs 312 in the row L2 is lower as a whole than the temperature distributions caused by heat from the LEDs 312 in the rows L1 and L3. Consequently, in the temperature distribution caused by heat from the LEDs 312 in all the rows represented by the dashed line Tt, the increase in temperature can be suppressed particularly in the vicinity of the positions P2 at which the LEDs 312 in the row L2 are arranged.

The number of rows composed of the LEDs 312 and the connection plate 314A or 314B is not limited to three, and the circuit board 311 may include a larger number of rows. For example, four rows may be formed on the circuit board 311. In this case, the width in the first direction y of the connection plates 314B included in two middle rows is larger than the width in the first direction y of the connection plates 314A included in two rows on both sides. In this case, the widths in the first direction y of the connection plates 314B included in the two middle rows may be equal to each other. With this, the temperature of the LEDs 312 included in the two middle rows becomes uniform easily.

Figure 23:
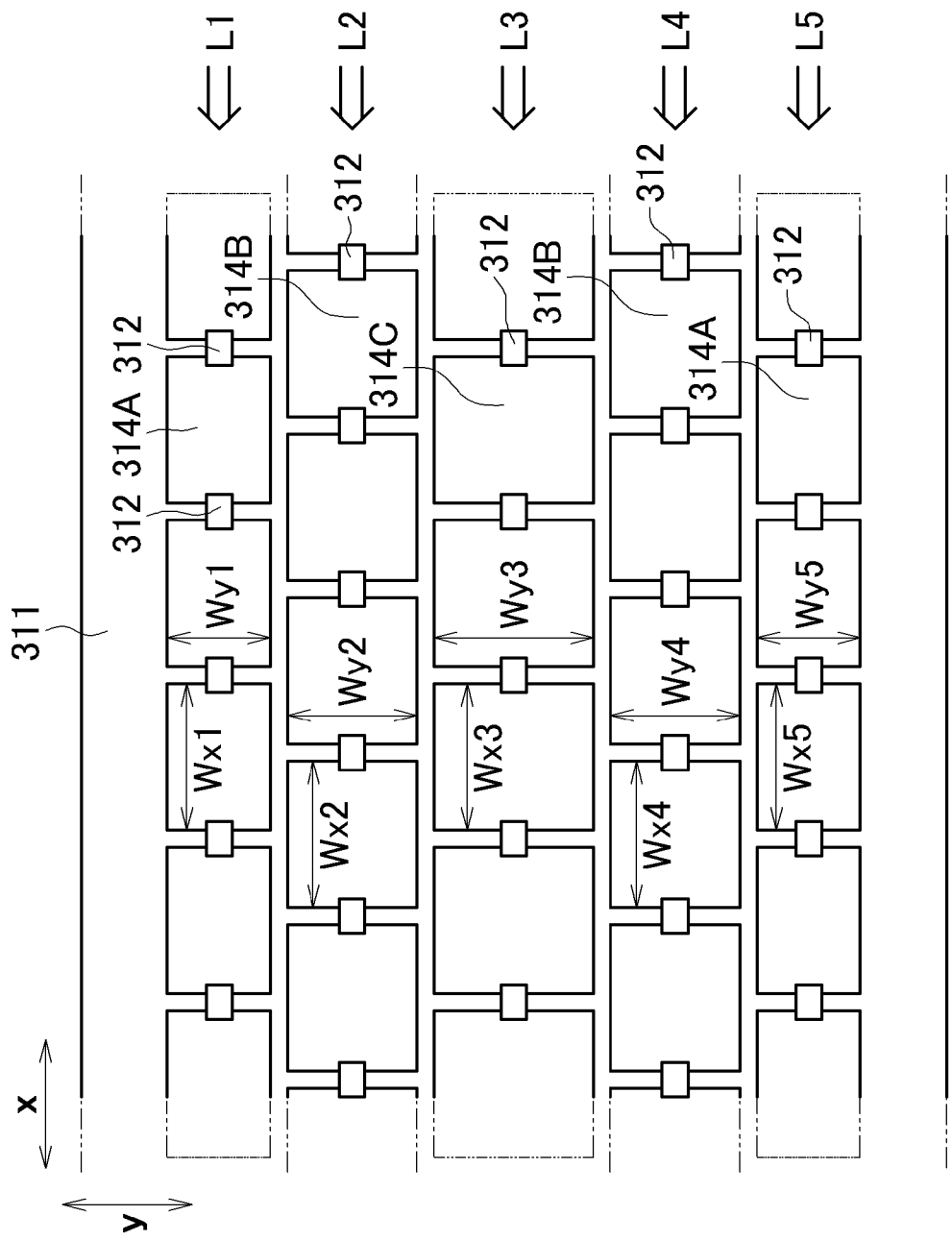
FIG. 23 is a plan view illustrating a modified example of the circuit board according to the third embodiment of the present application.

FIG. 23 is a plan view illustrating a modified example of the circuit board 311. Note that, points different from the example illustrated in FIG. 21 are mainly described below, and the other points are the same as in the example of FIG. 21.

In the example of FIG. 23, the circuit board 311 includes five rows L1, L2, L3, L4, and L5 as rows composed of the LEDs 312 and the connection plate 314A, 314B, or 314C. In FIG. 23, the rows L1 and L5 are two rows on both sides, that is, two rows on edge sides, and the rows L2, L3, L4 are rows between the rows L1 and L5.

The connection plates 314A, 314B, and 314C arranged in the five rows L1, L2, L3, L4, and L5 are larger in accordance with the distances from the two rows L1 and L5 on both sides. In other words, the connection plates 314B in the rows L2 and L4 are larger than the connection plates 314A in the rows L1 and L5, and the connection plate 314C in the middle row L3 is larger than the connection plates 314B in the rows L2 and L4. This arrangement can effectively suppress the accumulation of heat in the vicinity of the cathode of the LED 312 in the middle row L3.

In this example, widths Wy2 and Wy4 of the connection plates 314B in the first direction y are larger than widths Wy1 and Wy5 of the connection plates 314A in the first direction y. A width Wy3 of the connection plate 314C in the middle row L3 in the first direction y is larger than the widths Wy2 and Wy4 of the connection plates 314B in the first direction y. On the other hand, widths Wx2, Wx3, and Wx4 of the connection plates 314B and 314C in the second direction x are equal to widths Wx1 and Wx5 of the connection plates 314A in the second direction x. In other words, also in this example, the connection plates 314B and 314C each have a shape obtained by extending the connection plate 314A in the first direction y. Further, similarly to FIG. 21, the positions of the LEDs 312 in one of two adjacent rows are offset in the second direction x with respect to the positions of the LEDs 312 in the other row by a half distance of the interval of the LEDs 312.

Figure 24:
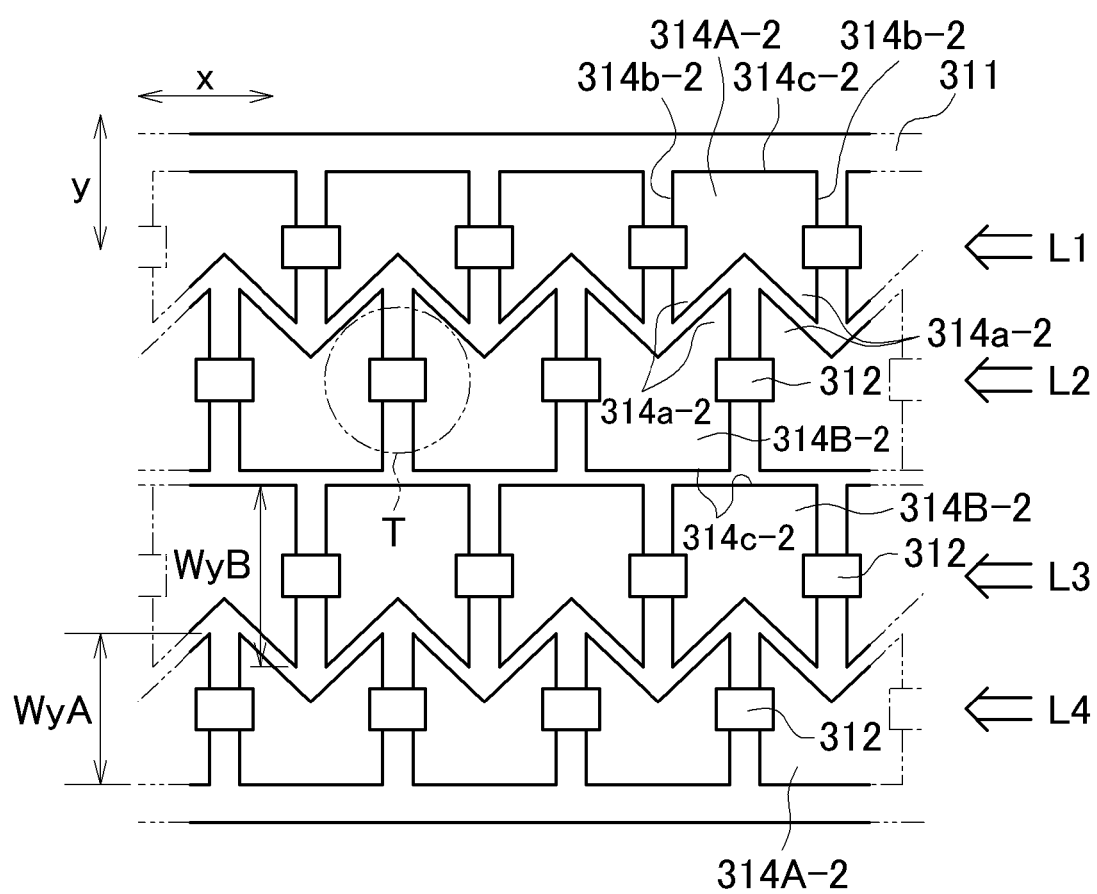
FIG. 24 is a plan view illustrating a second modified example of the circuit board according to the third embodiment of the present application.

FIG. 24 is a plan view illustrating a second modified example of the circuit board 311. Note that, points different from the example illustrated in FIG. 21 are mainly described below, and the other points are the same as in the example of FIG. 21.

Heat of the LED 312 is spread in a concentric manner from terminals (that is, the cathode and the anode). As described above, the temperature is higher in particular on the cathode side. Accordingly, in the example of FIG. 24, the shape of the connection plate is appropriately designed so that the radius of a maximum circle T (two-dot chain line T in FIG. 24) that can be assumed on the connection plate and is centered at the terminals of the LED 312 may be larger than that in the case of a rectangular connection plate.

Specifically, the circuit board 311 of FIG. 24 includes a plurality of connection plates 314A-2 and 314B-2 arranged in the second direction x together with the plurality of LEDs 312. Each of the connection plates 314A-2 and 314B-2 includes two edge portions 314b-2 located on both sides in the second direction x. The cathode and the anode of the LED 312 are connected to the edge portions 314b-2. Each of the connection plates 314A-2 and 314B-2 includes protrusion portions 314a-2 protruding in the first direction Y in plan view to the edge portion 314b-2 side. Such shapes of the connection plates 314A-2 and 314B-2 can increase the radius of the maximum circle T that can be assumed on the connection plates and is centered at the terminals of the LED 312. In this example, each of the connection plates 314A-2 and 314B-2 includes an edge 314c-2 along the second direction x. The two protrusion portions 314a-2 are formed on the opposite side of the edge 314c-2. In this example, the protrusion portions 314a-2 are triangular in plan view.

Also in this example, the positions of the LEDs 312 in one of two adjacent rows are offset in the second direction x with respect to the positions of the LEDs 312 in the other row by a half distance of the interval of the LEDs 312. The protrusion portion 314a-2 of the connection plate 314A-2 or 314B-2 in one row overlaps with the protrusion portion 314a-2 of the connection plate 314A-2 or 314B-2 in the other row in the second direction x. In other words, the protrusion portion 314a-2 of the connection plate 314A-2 or 314B-2 in one row is fitted into a recess portion formed between two protrusion portions 314a-2 of the connection plate 314A-2 or 314B-2 in the other row. This arrangement can suppress the enlargement of the width of the circuit board 311 in the first direction y.

In the example of FIG. 24, the circuit board 311 has four rows L1, L2, L3, and L4 as rows composed of the plurality of LEDs 312 and the plurality of connection plates 314A-2 or 314B-2. The two rows L1 and L4 on both sides include the connection plates 314A-2, and the two middle rows L2 and L3 include the connection plates 314B-2. The connection plates 314A-2 and the connection plates 314B-2 are arranged so that the protrusion portions 314a-2 thereof overlap with each other in the second direction x. The connection plates 314B-2 in the row L2 and the connection plates 314B-2 in the row L3 are arranged so that the edges 314c-2 thereof are opposed to each other in the first direction y.

Also in the example of FIG. 24, similarly to the example of FIG. 21, the connection plates 314B-2 arranged in the two middle rows L2 and L3 each have a larger area than those of the connection plates 314A-2 arranged in the two rows L1 and L4 on both sides. Specifically, the width of the connection plate 314B-2 in the first direction y is larger than that of the connection plate 314A-2. The width of the connection plate 314B-2 in the second direction x is equal to that of the connection plate 314A-2. In other words, the connection plate 314B-2 has a shape obtained by extending the connection plate 314A-2 in the first direction y. Thus, a maximum width WyB and a minimum width of the connection plate 314B-2 in the first direction y are larger than a maximum width WyA and a minimum width of the connection plate 314A-2, respectively. In this example, each of the connection plates 314A-2 and 314B-2 includes the protrusion portions 314a-2 on the edge portion 314b-2 side. Thus, the widths of the connection plates 314A-2 and 314B-2 in the first direction y are the maximum widths WyA and WyB at the two edge portions 314b-2 connected to the LED 312. Those widths are gradually decreased in accordance with the distance from the edge portions 314b-2 and become the minimum at the center in the second direction x.

Figure 25:
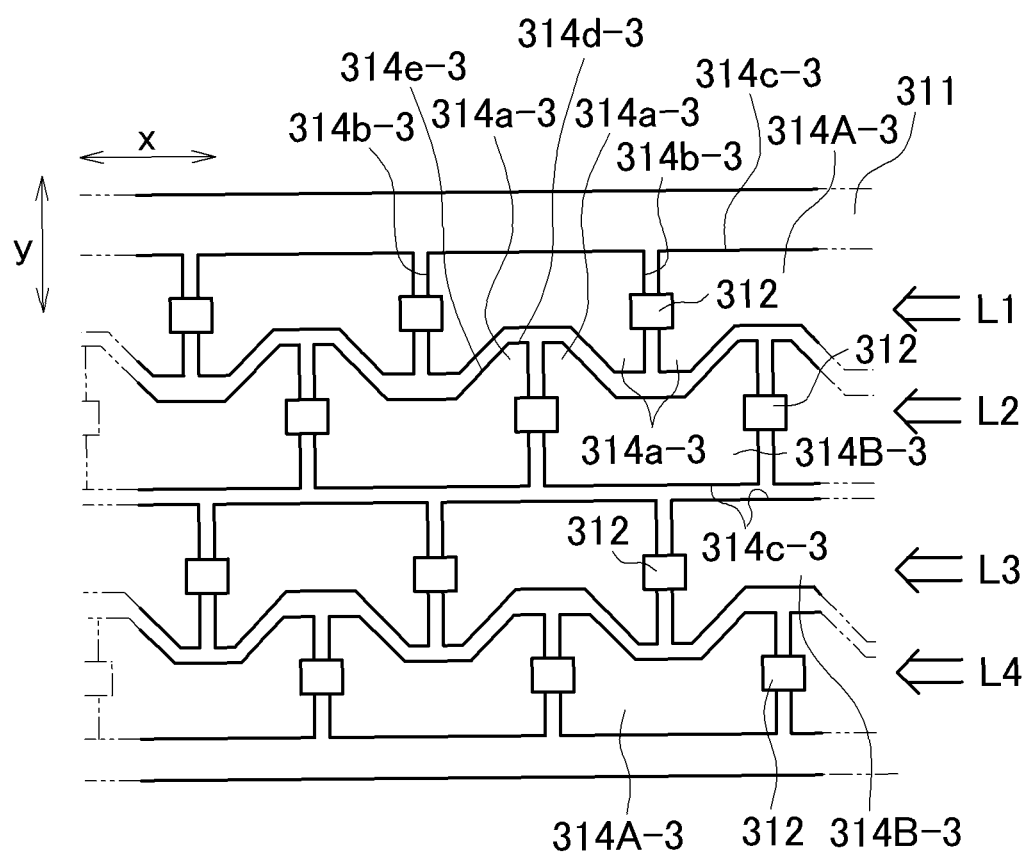
FIG. 25 is a plan view illustrating a third modified example of the circuit board according to the third embodiment of the present application.

FIG. 25 is a plan view illustrating a third modified example of the circuit board 311. Note that, points different from the example illustrated in FIG. 24 are mainly described below, and the other points are the same as in the example of FIG. 24.

The circuit board 311 of FIG. 25 includes a connection plate 314A-3 and a connection plate 314B-3 that correspond to the above-mentioned connection plates 314A-2 and 314B-2, respectively. Each of the connection plates 314A-3 and 314B-3 includes two edge portions 314b-3 each connected to the LED 312. Each of the connection plates 314A-3 and 314B-3 includes protrusion portions 314a-3 that correspond to the above-mentioned protrusion portions 314a-2 on the edge portion 314b-3 side. Thus, also in this example, the radius of the maximum circle that can be assumed on the connection plates and is centered at the terminals of the LED 312 can be increased. The protrusion portion 314a-3 in this example is trapezoidal, and includes an edge 314d-3 along the second direction x and an edge 314e-3 extending obliquely from the edge 314d-3.

Also in this example, the positions of the LEDs 312 in one of two adjacent rows are offset in the second direction x with respect to the positions of the LEDs 312 in the other row by a half distance of the interval of the LEDs 312. The protrusion portion 314a-3 of the connection plate 314A-3 or 314B-3 in one row overlaps with the protrusion portion 314a-3 of the connection plate 314A-3 or 314B-3 in the other row in the second direction x. In other words, the protrusion portion 314a-3 is located to be fitted into a recess portion formed between two protrusion portions 314a-3 included in the connection plate 314A-3 or 314B-3 in an adjacent row.

In the example of FIG. 25, the circuit board 311 has four rows L1, L2, L3, and L4. The two rows L1 and L4 on both sides include the connection plates 314A-3, and the two middle rows L2 and L3 include the connection plates 314B-3. The connection plates 314A-3 in the row L1 and the connection plates 314B-3 in the row L2 are arranged so that the protrusion portions 314a-3 thereof overlap with each other in the second direction x. Similarly, the connection plates 314B-3 in the row L3 and the connection plates 314A-3 in the row L4 are arranged so that the protrusion portions 314a-3 thereof overlap with each other in the second direction x. The connection plates 314B-3 in the row L2 and the connection plates 314B-3 in the row L3 are arranged so that edges 314c-3 thereof are opposed to each other.

Also in the example of FIG. 25, similarly to the above-mentioned connection plate 314B-2, the connection plate 314B-3 has a shape obtained by extending the connection plate 314A-3 in the first direction y. Thus, the maximum width and the minimum width of the connection plate 314B-3 in the first direction y are larger than the maximum width and the minimum width of the connection plate 314A-3, respectively. The width of the connection plate 314B-3 in the second direction x is equal to that of the connection plate 314A-3.

Figure 26:
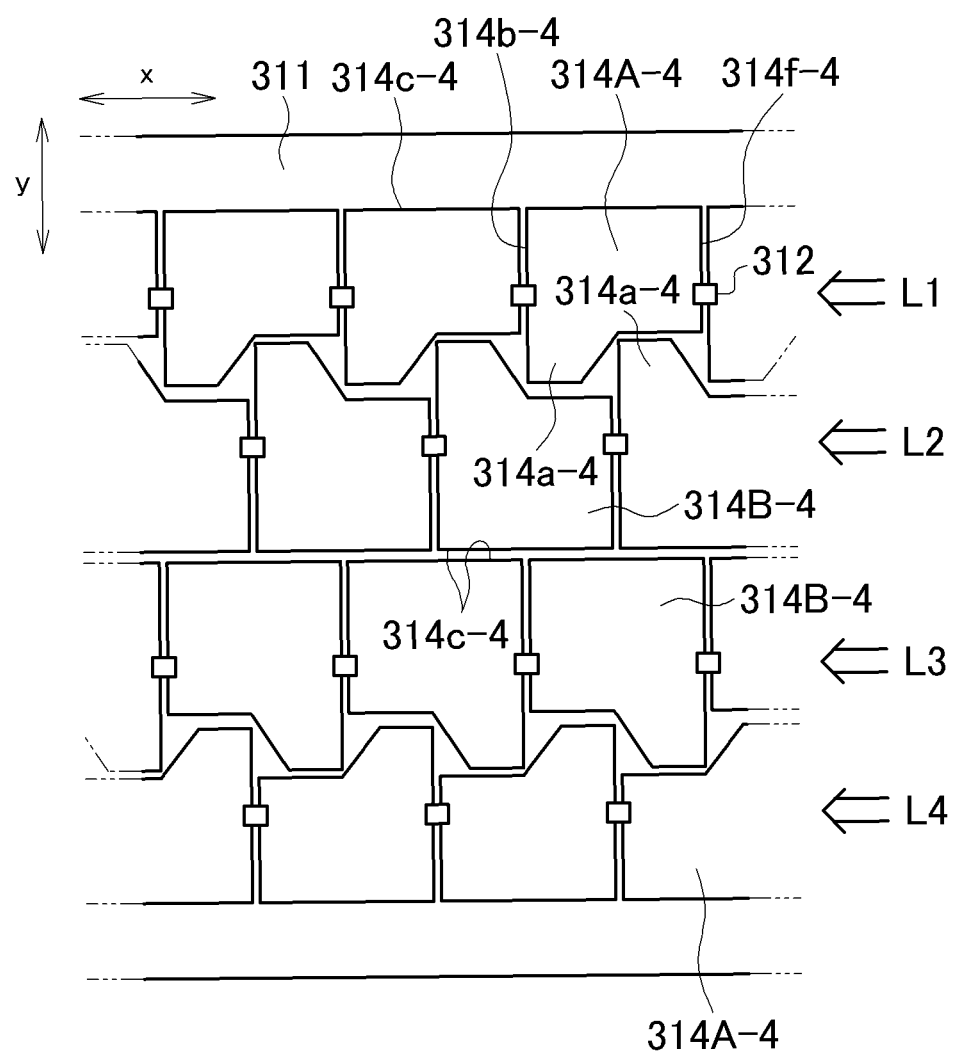
FIG. 26 is a plan view illustrating a fourth modified example of the circuit board according to the third embodiment of the present application.

FIG. 26 is a plan view illustrating a fourth modified example of the circuit board 311. Note that, points different from the example illustrated in FIG. 25 are mainly described below, and the other points are the same as in the example of FIG. 25.

The circuit board 311 of FIG. 26 includes a plurality of connection plates 314A-4 and 314B-4. Each of the connection plates 314A-4 and 314B-4 includes two edge portions 314b-4 and 314f-4 each connected to the LED 312. The cathode of the LED 312 is connected to the edge portion 314b-4, and the anode of the LED 312 is connected to the edge portion 314f-4. Each of the connection plates 314A-4 and 314B-4 includes a protrusion portion 314a-4 that corresponds to the above-mentioned protrusion portion 314a-3 only on the edge portion 314b-4 side. Thus, in this example, the radius of the maximum circle that can be assumed on the connection plates and is centered at the cathode terminal of the LED 312 can be further increased. Note that, also the protrusion portion 314a-4 in this example is trapezoidal in plan view similarly to the above-mentioned protrusion portion 314a-3.

Also in this example, the positions of the LEDs 312 in one of two adjacent rows are offset in the second direction x with respect to the positions of the LEDs 312 in the other row by a half distance of the interval of the LEDs 312. The protrusion portion 314a-4 of the connection plate 314A-4 and the protrusion portion 314a-4 of the connection plate 314B-4 overlap with each other in the second direction x.

Also in the example of FIG. 26, the circuit board 311 has four rows L1, L2, L3, and L4. The two rows L1 and L4 on both sides include the connection plates 314A-4, and the two middle rows L2 and L3 include the connection plates 314B-4. The connection plates 314A-4 in the row L1 and the connection plates 314B-4 in the row L2 are arranged so that the protrusion portions 314a-4 thereof overlap with each other in the second direction x. Similarly, the connection plates 314B-4 in the row L3 and the connection plates 314A-4 in the row L4 are arranged so that the protrusion portions 314a-4 thereof overlap with each other in the second direction x. The connection plates 314B-4 in the row L2 and the connection plates 314B-4 in the row L3 are arranged so that edges 314c-4 thereof along the second direction x are in proximity to each other.

Also in the example of FIG. 26, similarly to the example of FIG. 21, the connection plates 314B-4 arranged in the two middle rows L2 and L4 each have a larger area than those of the connection plates 314A-4 arranged in the two rows L1 and L4 on both sides. Specifically, the connection plate 314B-4 has a shape obtained by extending the connection plate 314A-4 in the first direction y, and the width of the connection plate 314B-4 in the first direction y is larger than that of the connection plate 314A-4. The width of the connection plate 314B-4 in the second direction x is equal to that of the connection plate 314A-4.

As described above, in the liquid crystal display device 301, the plurality of connection plates 314A, 314A-2, 314A-3, and 314A-4 arranged in the row(s) between two rows on both sides among three or more rows are larger than the plurality of connection plates 314B, 314C, 314B-2, 314B-3, and 314B-4 arranged in the two rows on both sides. Consequently, heat of the LEDs 312 arranged in the row (s) between the two rows on both sides can be efficiently released. In particular, the connection plates 314A, 314A-2, 314A-3, and 314A-4 are larger than the connection plates 314B, 314C, 314B-2, 314B-3, and 314B-4 in width in the first direction y. Consequently, there is no need to decrease the arrangement density of the LEDs 312 arranged in the middle row (s) as compared to the arrangement density of the LEDs 312 arranged in the two rows on both sides. As a result, the brightness of the backlight unit 310 can be enhanced easily.

Note that, in the above description, the first direction y is the vertical direction of the backlight unit 310, and the second direction x is the horizontal direction of the backlight unit 310. Alternatively, however, the first direction may be defined as the horizontal direction of the backlight unit 310, and the second direction may be defined as the vertical direction of the backlight unit 310. In this case, the circuit board 311 is a board elongated in the vertical direction, and is arranged at a horizontal center portion of the backlight unit 310.

Further, in the above description, the plurality of connection plates 314A to 314B-4 have equal widths in the second direction x. Alternatively, however, the connection plates 314B, 314C, 314B-2, 314B-3, and 314B-4 that form one or a plurality of middle rows may be larger in width in the second direction x than the connection plates 314A, 314A-2, 314A-3, and 314A-4 that form two rows on both sides. In other words, the arrangement density of the LEDs 321 may be decreased in the middle row (s) than in the two rows on both sides.

Further, in the liquid crystal display device 301, the regions A and B on both sides of the circuit board 311 are larger than the circuit board 311 in width in the first direction y. Alternatively, however, the connection plates described above may be applied to a liquid crystal display device in which the circuit board 311 is located at a center portion in the first direction y but the regions A and B are smaller than the circuit board 311 in width in the first direction y.

By incorporating the liquid crystal display device 301, a television receiver configured to receive television broadcast radio waves to display a video and output sound can be constructed. An exemplary television receiver is described below.

Figure 27:
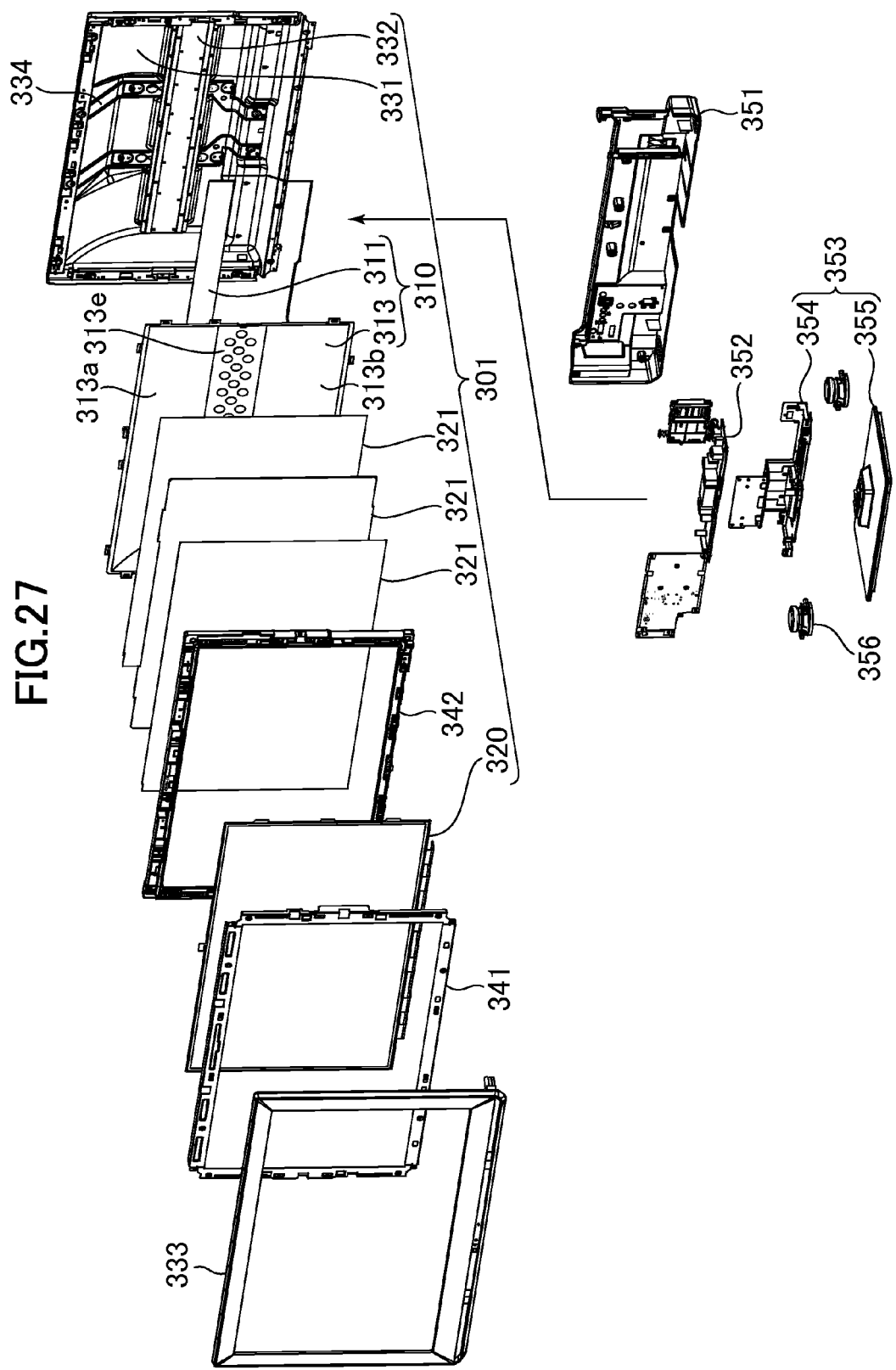
FIG. 27 is an exploded perspective view of a television receiver according to one embodiment of the present application.
Figure 28:
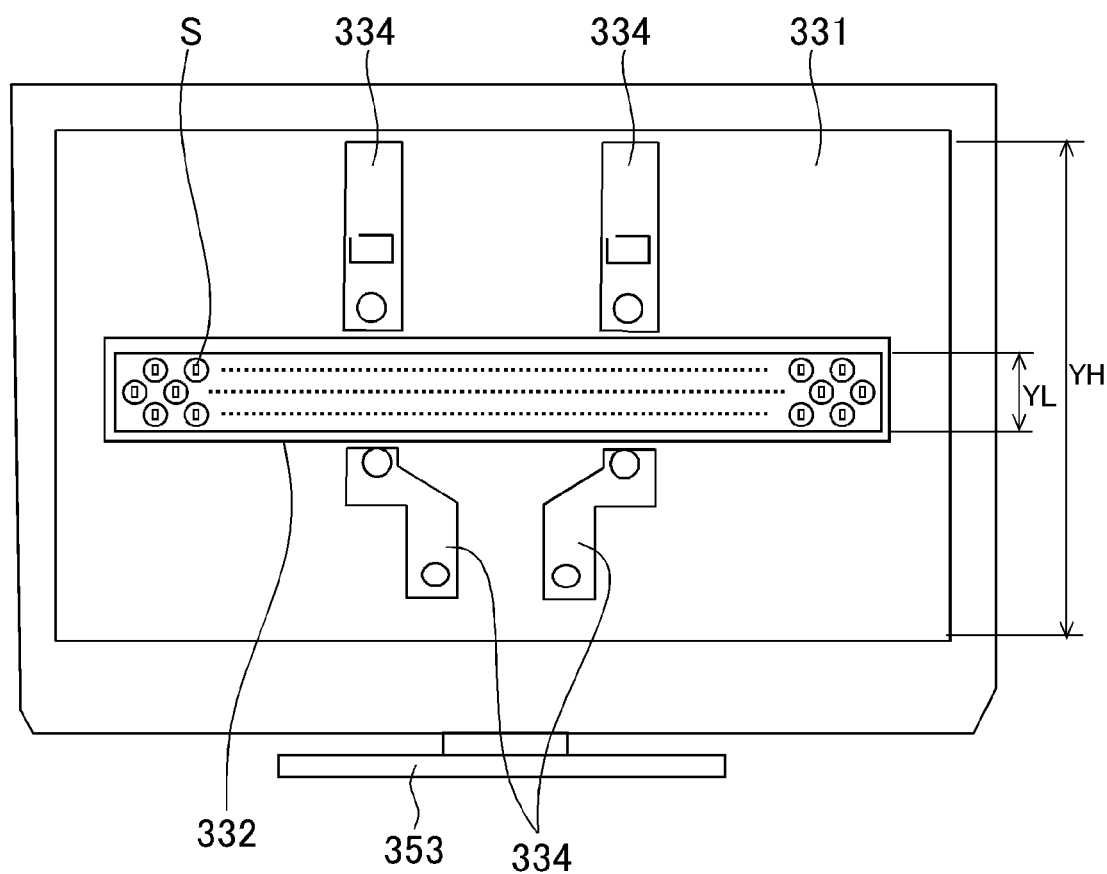
FIG. 28 is a front view illustrating members arranged behind a reflection sheet of the television receiver illustrated in FIG. 27.
Figure 29:
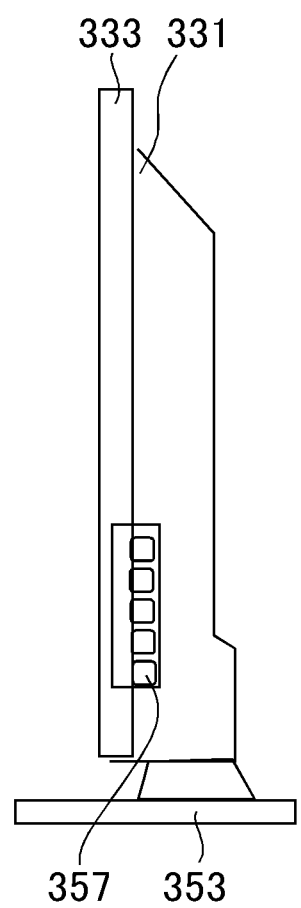
FIG. 29 is a side view of the television receiver illustrated in FIG. 27.
Figure 30:
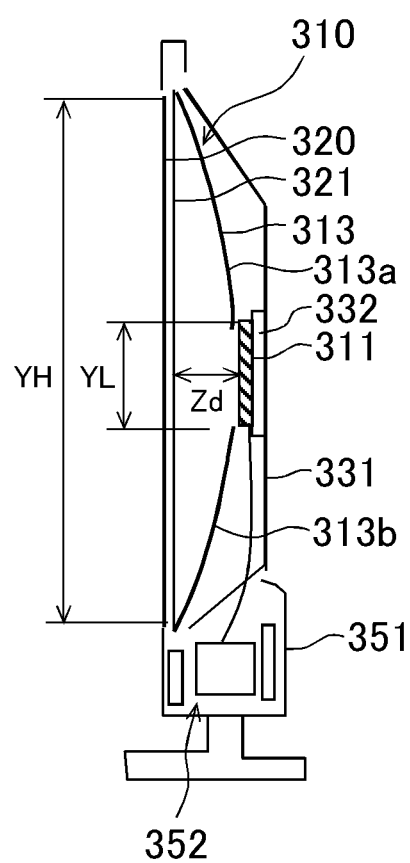
FIG. 30 is a schematic view illustrating a vertical cross-section of the television receiver illustrated in FIG. 28.

FIG. 27 is an exploded perspective view of a television receiver according to one embodiment of the present application. FIG. 28 is a front view illustrating members arranged behind the reflection sheet 313 of the television receiver illustrated in FIG. 27. FIG. 29 is a side view of the television receiver illustrated in FIG. 27. FIG. 30 is a schematic view illustrating a vertical cross-section of the television receiver illustrated in FIG. 27.

The television receiver includes the liquid crystal display panel 320 having a landscape-oriented screen. The aspect ratio of the screen of the television receiver (ratio of horizontal dimension and vertical dimension) is 16:9. The front side of the liquid crystal display panel 320 (image display side) is supported by a front frame 341, and the rear side thereof is supported by a mold frame 342. The television receiver includes the backlight unit 310 overlapping with the liquid crystal display panel 320.

The liquid crystal display panel 320, the front frame 341, the mold frame 342, and the backlight unit 310 are housed in a cabinet including a front cabinet 333 and a back cabinet 331. The front cabinet 333 is formed of a resin, and the back cabinet 331 is formed of coated iron. The cabinets 331 and 333 are supported by a stand 353 including a mount 355 and a leg 354. As illustrated in FIG. 29, switches 357 are arranged on side surfaces of the cabinets 331 and 333.

A cover 351 is mounted behind the lower portion of the back cabinet 331. Speakers 356 and a circuit board 352 are arranged inside the cover 351. The circuit board 352 includes a tuning circuit (tuner) for selecting a particular frequency radio wave from among various frequency radio waves.

The backlight unit 310 includes the reflection sheet 313 as described above. The reflection sheet 313 is arranged so that the recessed surface thereof faces the liquid crystal display panel 320. Portions of the reflection sheet 313 excluding the bottom portion 313e are spaced apart from the back cabinet 331 toward the front (see FIG. 19 and FIG. 30). The upper portion 313a and the lower portion 313b are located so as to sandwich the plurality of LEDs 312. The circuit board 352 is arranged in a lower space between the reflection sheet 313 and the back cabinet 331 (see FIG. 30).

The circuit board 311 is located on the opposite side of the reflective sheet 313 with respect to the liquid crystal display panel 320, and overlaps with the reflective sheet 313. The width of the circuit board 311 in the vertical direction is half or less of the length of the liquid crystal display panel 320 in the vertical direction. As described above, the plurality of LEDs 312 (see FIG. 19) are arranged behind substantially the center of the liquid crystal display panel 320, and are mounted on the circuit board 311. The LEDs 312 are arranged in three rows in the horizontal direction in a staggered manner.

The circuit board 311 is fixed onto the back cabinet 331. For example, the circuit board 311 is fixed directly onto the back cabinet 331. For example, the circuit board 311 is fixed onto the back cabinet 331 by screws. Further, as in the example described herein, the circuit board 311 may be fixed onto the back cabinet 331 via the radiator plate 332. For example, the circuit board 311 is fixed by screws onto the radiator plate 332 made of metal such as aluminum, and the radiator plate 332 may be fixed onto the back cabinet 331.

The circuit board 311 and the reflective sheet 313 are in proximity to the back cabinet 331. Consequently, thinning of the television receiver can be attained. Specifically, in the related-art backlight structure, the circuit board for mounting LEDs thereon is fixed onto a back frame (not shown) of the liquid crystal display device made of iron or aluminum, and a board for mounting thereon a power supply for driving the LEDs and a timing controller for controlling gate signal lines and drain signal lines of the liquid crystal display panel is arranged outside the back frame, followed by arranging the back cabinet further outside. Thus, the distance between the optical sheets and the LEDs in the backlight unit as well as the distance between the back frame and the back cabinet is necessary, with the result that the thickness of the liquid crystal display device is undesirably large. In this embodiment, on the other hand, the circuit board 311 and the radiator plate 332 are held in contact with each other, and the radiator plate 332 and the back cabinet 331 are fixed to each other by screws. Consequently, there are no other necessary distances than a distance Zd (see FIG. 30) between the optical sheets 321 and the circuit board 311, and hence the television receiver is thinned.

Thinning of the television receiver is attained also by the arrangement of the circuit board 352 including a power supply circuit, a video circuit, a tuning circuit (tuner), and a timing circuit for the liquid crystal display panel 320. Specifically, the upper portion 313a and the lower portion 313b of the reflection sheet 313 are curved in the direction away from the back cabinet 331, and hence a wide space can be obtained between the reflection sheet 313 and the back cabinet 331. Further, the circuit board 352 including the power supply circuit, the video circuit, the tuning circuit (tuner), and the timing circuit for the liquid crystal display panel 320 is housed in the lower portion of the television receiver in a compact manner. This eliminates the need of providing a space for housing the power supply circuit and the like between the circuit board 311 and the back cabinet 331.

As the circuit board 311, a printed wiring board can be used. As described above, the backlight unit 310 has the regions A and B devoid of the light sources. The vertical length of each of the regions A and B is larger than the vertical length of the circuit board 311. Thus, as illustrated in FIG. 28, a vertical dimension YL of the circuit board 311 is ⅓ or less of a vertical dimension YH of the liquid crystal display panel 320.

As described above, the lens 315 is arranged on each LED 312, and the pair of the LED 312 and the lens 315 constructs one point light source S (see FIG. 19). The point light source S is mounted on the circuit board 311, and protrudes to the front side of the bottom portion 313e of the reflection sheet 313 (see FIG. 20) through a hole formed in the bottom portion 313e. The plurality of point light sources S are arranged in at least three rows in the horizontal direction of the screen. The overall vertical width of the plurality of point light sources S is half or less of the vertical length of the liquid crystal display panel 320.

Figure 31:
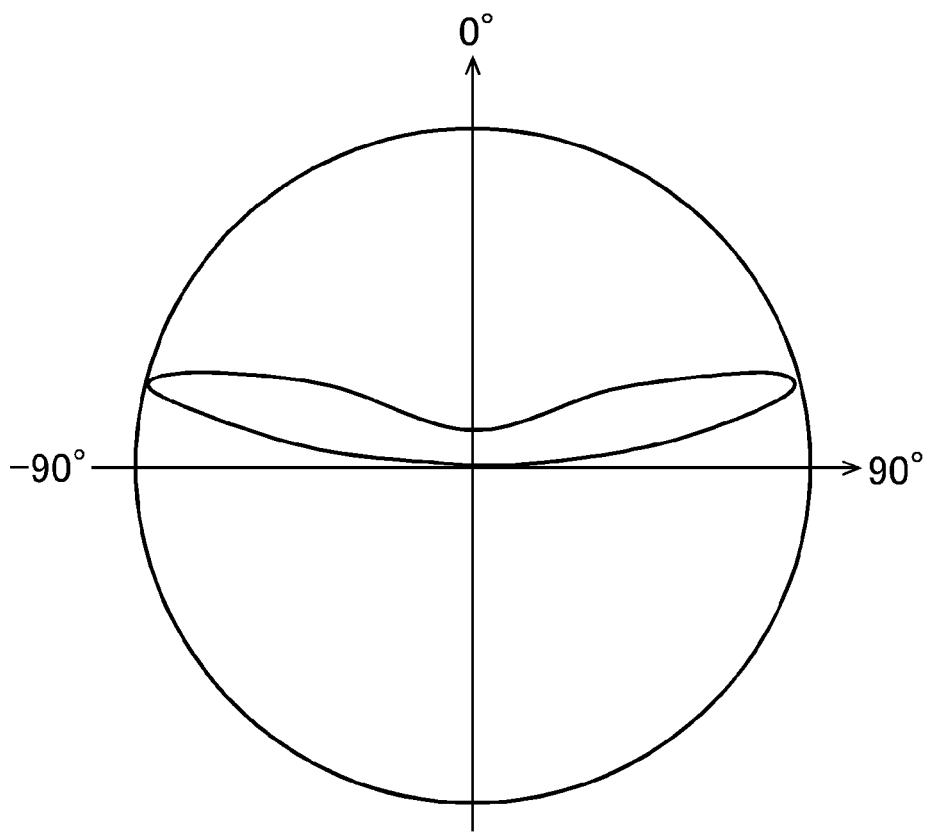
FIG. 31 shows a light intensity distribution (directivity characteristics) of a point light source.
Figure 32:
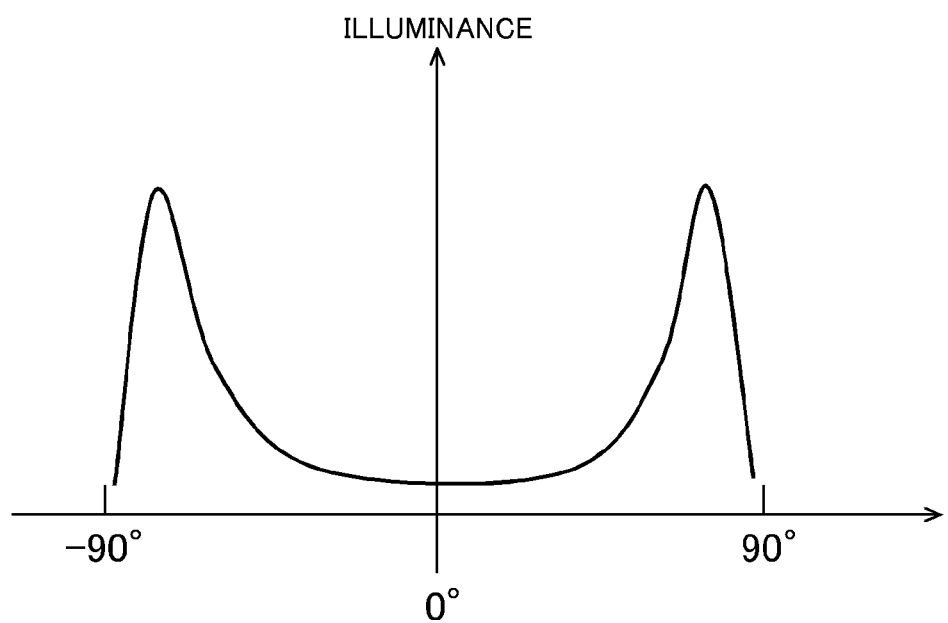
FIG. 32 is a graph showing a result of measuring intensity of light emitted from a lens, specifically, illuminance of the point light source.

The point light source S emits light not only in the direction perpendicular to the circuit board 311 but also in other directions. Light intensity of the light source S is higher in other directions than in the direction perpendicular to the circuit board 311. The lens 315 expands the light emitted from the LED 312 more in a viewing direction than in the front direction. FIG. 31 shows such a light intensity distribution (directivity characteristics) of the point light source S. FIG. 32 is a graph showing a result of measuring the intensity of light emitted from the lens 315, specifically, the illuminance of the point light source S. Note that, e represents an angle formed by the direction perpendicular to the circuit board 311 and the light output direction.

One feature of the television receiver described herein resides in that the entire screen is bright and the uniformity of brightness of the entire screen is high even though the vertical dimension YL of the circuit board 311 is reduced to be ⅓ or less of the vertical dimension YH of the liquid crystal display panel 320.

A related-art television receiver includes a plurality of circuit boards each having a plurality of light emitting diodes mounted thereon, and the overall size of the plurality of circuit boards conforms to the size of the liquid crystal display panel. The circuit boards and the LEDs mounted on the circuit boards are laid out so that brightness may not vary even in a region between the circuit boards. Specifically, in order to prevent the positions of the individual LEDs from being optically recognized, a large number of LEDs are used and the interval between the LEDs is set to be small.

In the example described herein, the interval between two lenses 315 located farthest away from each other in the vertical direction is ⅓ or less of the dimension YH of the liquid crystal display panel 320. To reduce cost, the LED 312 and the lens 315 are set to have the dimensions not protruding outside of the circuit board 311.

In this example, the dimension YL of the circuit board 311, or the distance between an upper edge of the lens 315 in the top row and a lower edge of the lens 315 in the bottom row is ⅓ or less of the dimension YH of the liquid crystal display panel 320. In this way, the number of LEDs 312 is reduced more than hitherto, and the cost may be significantly reduced. Because the lens 315 and the reflection sheet 313 are used, the liquid crystal display panel 320 that is bright and has a natural brightness distribution can be obtained even when the number of LEDs 312 is reduced.

In this embodiment, the overall width of the upper portion 313a and the lower portion 313b of the reflection sheet 313 is set to have a length obtained by subtracting the dimension YL of the circuit board 311 from the dimension YH of the liquid crystal display panel 320. When the sum of the width of the upper portion 313a and the width of the lower portion 313b is ½ or more of the dimension YH, the brightness distribution of the screen becomes smoother, and the number of LEDs 312 can be significantly reduced to reduce the cost. In other words, the cost can be reduced by setting the reflective region including the upper portion 313a and the lower portion 313b to be larger than the region in which the point light sources S are arranged.

Light emitted from the LED 312 is expanded by the lens 315. The LED 315 has such light distribution characteristics that light intensity is higher in the oblique direction than in the direct front direction. With the lens 315 mounted on each of the plurality of LEDs 312, in a space from the circuit board 311 to the optical sheets 321 (see FIG. 19), the intensity of radiation light directed in the vertical direction is larger than the intensity of radiation light directed in the direct front direction. Part of light emitted from the lens 315 to the front passes through the optical sheets 321 to be displayed as an image through the liquid crystal display panel 320. The rest of the light emitted to the front is reflected on the optical sheets 321 and the reflection sheet 313 to be emitted also in the direction oblique to the front. Part of light emitted obliquely in the vertical direction through the lens 315 passes through the outer peripheral portion of the liquid crystal display panel 320 through the optical sheets 321. Another part of the light emitted obliquely is reflected on the reflection sheet 313 to be directed to the optical sheets 321.

Brightness performance of the television receiver described herein is as follows. When the brightness measured on the front surface is 100%, the brightness at the outer peripheral portion is about 30%. The ratio of the central brightness of the liquid crystal display panel 320 to the average brightness is 1.65. However, the upper portion 313a and the lower portion 313b of the reflection sheet 313 are gently curved, and hence the brightness gently varies from the circuit board 311 in the vertical direction. As described above, there is no point at which the brightness abruptly varies, and hence a high-quality image can be provided. The fact that the smooth brightness distribution can be obtained even when the ratio of the central brightness to the average brightness is 1.65 or more means that the number of LEDs 312 can be reduced to decrease the width of the circuit board 311. Note that, in the structure in which light radiation to the front surface of the liquid crystal display panel 320 is blocked, the center of the liquid crystal display panel 320 is dark. To address this, the light emission characteristics of the individual point light source S including the LED 312 and the lens 315 are set to have a predetermined output also in the direct front direction.

The back cabinet 331 serves as the outermost surface of the television receiver. The circuit board 311 is fixed onto the radiator plate 332 by screws, and heat of the LEDs 312 is released from the connection plates 314A and 314B of the circuit board 311 (see FIG. 21) and the radiator plate 332. Note that, when the brightness of the television receiver is low, that is, when the amount of heat released from the LEDs 312 is small, the circuit board 311 may be fixed directly onto the back cabinet 331 without using the radiator plate 332. In this case, heat dissipation of the LED 312 is performed only by the circuit board 311, but even by the heat dissipation effects of the circuit board 311 itself and the connection plates 314A and 314B arranged on the circuit board 311, the temperature of the connection portions of the LEDs 312 can be suppressed.

Next, a process of manufacturing the television receiver is described. A bracket 334 for wall hanging is mounted on an inner side of the back cabinet 331 formed by coating a member made of iron. The bracket 334 reinforces the strength of the back cabinet 331. The bracket 334 has a screw hole formed therein. The screw hole is used to hook a screw fixed on the wall. After the bracket 334 is mounted, the radiator plate 332 is fixed on the inner side of the back cabinet 331.

Next, the circuit board 311 having the LEDs 312 mounted thereon is mounted on the radiator plate 332. The lens 315 is capped on the LED 312, and is fixed by an adhesive, for example. When heat resistance of the connection portion of the LED 312 has a margin, the circuit board 311 may be mounted directly on the back cabinet 331. In this case, the circuit board 311 is coated in advance with a white resist so that the surface of the circuit board 311 may easily reflect light emitted from the LED 312. Next, the reflection sheet 313 is mounted on the circuit board 311. The optical sheets 321 such as a diffusion sheet and a prism sheet having a thickness of 1.5 mm to 3 mm are arranged in front of the reflection sheet 313.

Next, the optical sheets 321 are fixed by the mold frame 342, which is made of a resin material and divided into four pieces. The liquid crystal display panel 320 is arranged in front of the optical sheets 321. The front frame 341 formed of iron is arranged on the front side of the liquid crystal display panel 320, which is used to prevent a magnetic wave from the driver IC and fix the liquid crystal display panel 320.

To finally complete the television receiver, the front cabinet 333 made of a resin material is mounted on the surface of the front frame 341, and a power supply circuit for supplying power to a control circuit, a timing control circuit, and a video circuit for the LEDs 312, an external connection terminal, and the like are arranged under the cabinets 331 and 333, followed by mounting the protective cover 351 made of a resin.

Note that, the embodiments described above are specific examples for describing the present invention, and the present invention is not intended to be limited to the embodiments. For example, in the embodiments, the lens is provided on the front surface of the light emitting diode, but the lens is not always necessary if light emitted from the light emitting diode is sufficiently diffused. In the embodiments, the liquid crystal display device is structured to have only a single light emitting diode substrate at the lateral center of the liquid crystal display device, but may be structured to have two or more light emitting diode substrates that are arranged side by side in the lateral direction thereof. Further, the number and arrangement of the light emitting diodes and the number, shape, and arrangement of other members are not limited to the ones described in the embodiments, and an appropriate number, shape, and arrangement are intended to be optimized as necessary.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A liquid crystal display device, comprising:
    a liquid crystal panel;
    a reflection sheet arranged on a rear surface side of the liquid crystal panel, the reflection sheet being curved so that a surface facing the liquid crystal panel is recessed; and
    a light emitting diode substrate comprising:
        a light emitting diode array in which a plurality of light emitting diodes are arranged along a longitudinal direction of the light emitting diode substrate; and
        electrodes connected to the plurality of light emitting diodes,
    wherein, in a circle whose center is at one of the plurality of light emitting diodes and whose diameter is a distance from the one of the plurality of light emitting diodes to another of the plurality of light emitting diodes adjacent to the one of the plurality of light emitting diodes, an area of the electrode connected to a high temperature side electrode of the one of the plurality of light emitting diodes is larger than an area of the electrode connected to a low temperature side electrode of the one of the plurality of light emitting diodes, and
    wherein the plurality of light emitting diodes are arranged so that the low temperature side electrodes and the high temperature side electrodes are adjacent to one another in the longitudinal direction, and each of the plurality of light emitting diodes has a lens arranged in front thereof.

2. The liquid crystal display device according to claim 1, wherein the low temperature side electrode comprises an anode of each of the plurality of light emitting diodes, and the high temperature side electrode comprises a cathode of the each of the plurality of light emitting diodes.

3. The liquid crystal display device according to claim 1, wherein the electrode connected to the low temperature side electrode of the one of the plurality of light emitting diodes and the electrode connected to the high temperature side electrode of the one of the plurality of light emitting diodes partially overlap with each other in a lateral direction of the light emitting diode substrate.

4. The liquid crystal display device according to claim 1, wherein at least a part of a boundary to separate the electrode connected to the low temperature side electrode of the one of the plurality of light emitting diodes and the electrode connected to the high temperature side electrode of the one of the plurality of light emitting diodes is non-parallel to a lateral direction, and is inclined toward the electrode connected to the low temperature side electrode, starting from the one of the plurality of light emitting diodes.

5. A liquid crystal display device, comprising:
    a liquid crystal panel;
    a reflection sheet arranged on a rear surface side of the liquid crystal panel, the reflection sheet being curved so that a surface facing the liquid crystal panel is recessed; and
    a light emitting diode substrate comprising:
        a plurality of light emitting diode arrays, in each of which a plurality of light emitting diodes are arranged along a longitudinal direction of the light emitting diode substrate; and
        electrodes connected to the plurality of light emitting diodes,
    wherein the electrode belonging to one of the plurality of light emitting diode arrays and the electrode belonging to another of the plurality of light emitting diode arrays are shaped to overlap with each other in the longitudinal direction, and
    wherein, in a circle whose center is at one of the plurality of light emitting diodes and whose diameter is a distance from the one of the plurality of light emitting diodes to another of the plurality of light emitting diodes closest to the one of the plurality of light emitting diodes, an area of the electrode connected to a high temperature side electrode of the one of the plurality of light emitting diodes is larger than an area of the electrode connected to a low temperature side electrode of the one of the plurality of light emitting diodes.

6. A liquid crystal display device, comprising:
    a liquid crystal panel;
    a reflection sheet arranged on a rear surface side of the liquid crystal panel, the reflection sheet being curved so that a surface facing the liquid crystal panel is recessed; and
    a light emitting diode substrate comprising:
        a plurality of light emitting diode arrays, in each of which a plurality of light emitting diodes are arranged along a longitudinal direction of the light emitting diode substrate; and
        electrodes connected to the plurality of light emitting diodes,
    wherein the electrode belonging to one of the plurality of light emitting diode arrays and the electrode belonging to another of the plurality of light emitting diode arrays are shaped to overlap with each other in the longitudinal direction, and wherein the low temperature side electrode comprises an anode of each of the plurality of light emitting diodes, and the high temperature side electrode comprises a cathode of the each of the plurality of light emitting diodes.

7. A liquid crystal display device, comprising:

a liquid crystal panel;

a reflection sheet arranged on a rear surface side of the liquid crystal panel, the reflection sheet being curved so that a surface facing the liquid crystal panel is recessed; and a light emitting diode substrate comprising:
- a plurality of light emitting diode arrays, in each of which a plurality of light emitting diodes are arranged along a longitudinal direction of the light emitting diode substrate; and
- electrodes connected to the plurality of light emitting diodes, wherein the electrode belonging to one of the plurality of light emitting diode arrays and the electrode belonging to another of the plurality of light emitting diode arrays are shaped to overlap with each other in the longitudinal direction, and wherein a length of a portion of the electrode connected to the high temperature side electrode in a lateral direction of the light emitting diode substrate is larger than a length of a portion of the electrode connected to the low temperature side electrode in the lateral direction.

8. A liquid crystal display device, comprising:

a liquid crystal panel;

a reflection sheet arranged on a rear surface side of the liquid crystal panel, the reflection sheet being curved so that a surface facing the liquid crystal panel is recessed; and a light emitting diode substrate comprising:
- a plurality of light emitting diode arrays, in each of which a plurality of light emitting diodes are arranged along a longitudinal direction of the light emitting diode substrate; and
- electrodes connected to the plurality of light emitting diodes, wherein the electrode belonging to one of the plurality of light emitting diode arrays and the electrode belonging to another of the plurality of light emitting diode arrays are shaped to overlap with each other in the longitudinal direction, and wherein a radius of a semicircle whose center is at the one of the plurality of light emitting diodes and which is inscribed in the electrode on the high temperature side electrode side is larger than a radius of a semicircle whose center is at the one of the plurality of light emitting diodes and which is inscribed in the electrode on the low temperature side electrode side.

9. A liquid crystal display device, comprising:

a liquid crystal display panel; and a backlight unit, the backlight unit comprising:
- a circuit board having a plurality of light emitting diodes (LEDs) serving as light sources mounted thereon, the circuit board being arranged to be opposed to the liquid crystal display panel and being smaller than the liquid crystal display panel in width in a first direction that is one of a vertical direction and a horizontal direction of the liquid crystal display panel; and
- two regions devoid of the light sources, the two regions being located on opposite sides across the circuit board in the first direction and each having a width larger than the width of the circuit board in the first direction, wherein the plurality of LEDs are arranged in at least three rows in a second direction orthogonal to the first direction, wherein the circuit board includes a plurality of connection plates arranged thereon, the plurality of connection plates being located between two of the plurality of LEDs adjacent in the second direction so as to electrically connect the two of the plurality of LEDs to each other, and wherein the plurality of connection plates arranged in a row between two rows on both sides among the at least three rows are larger than the plurality of connection plates arranged in the two rows on both sides.

10. The liquid crystal display device according to claim 9, wherein the plurality of connection plates arranged in the row between the two rows on both sides are larger than the plurality of connection plates arranged in the two rows on both sides in width in the first direction.

11. The liquid crystal display device according to claim 10, wherein the plurality of connection plates arranged in the row between the two rows on both sides are equal to the plurality of connection plates arranged in the two rows on both sides in width in the second direction.

12. The liquid crystal display device according to claim 9, wherein positions of the plurality of LEDs in one of two adjacent rows are offset with respect to positions of the plurality of LEDs in another of the two adjacent rows in the second direction.

13. The liquid crystal display device according to claim 9, further comprising a reflection sheet for reflecting light of the plurality of LEDs toward the liquid crystal display panel,
wherein the reflection sheet has a concave shape that is open toward the liquid crystal display panel, and the circuit board is located at a bottom of the reflection sheet.

14. The liquid crystal display device according to claim 9,
wherein the circuit board has at least five rows, each of which comprises the plurality of LEDs and the plurality of connection plates, and
wherein the plurality of connection plates arranged in the at least five rows are larger in accordance with a distance from the two rows on both sides to the row in which the plurality of connection plates are arranged.

15. The liquid crystal display device according to claim 9, wherein the plurality of connection plates are rectangular.

16. The liquid crystal display device according to claim 9,
wherein each of the plurality of connection plates comprises an edge portion connected to each of the plurality of LEDs, and
wherein the each of the plurality of connection plates comprises a protrusion portion on the edge portion side to protrude in the first direction.

17. A television receiver, comprising the liquid crystal display device according to claim 9,
the television receiver being configured to receive a television broadcast wave to display a video and output sound.

* * * * *